US006839831B2

(12) United States Patent
Balmer et al.

(10) Patent No.: US 6,839,831 B2
(45) Date of Patent: Jan. 4, 2005

(54) DATA PROCESSING APPARATUS WITH REGISTER FILE BYPASS

(75) Inventors: Keith Balmer, Bedford (GB); Richard D. Simpson, Carton (GB); Iain Robertson, Bedfordshire (GB); John Keay, Bedford (GB)

(73) Assignee: Texas Instruments Incorporated, Dallas, TX (US)

( * ) Notice: Subject to any disclaimer, the term of this patent is extended or adjusted under 35 U.S.C. 154(b) by 592 days.

(21) Appl. No.: 09/733,597

(22) Filed: Dec. 8, 2000

(65) Prior Publication Data

US 2002/0108026 A1 Aug. 8, 2002

(30) Foreign Application Priority Data

Feb. 9, 2000 (EP) .............................................. 00301294

(51) Int. Cl.[7] ................................................ G06F 9/28
(52) U.S. Cl. ....................................... 712/218; 712/219
(58) Field of Search ................................. 712/218, 219

(56) References Cited

U.S. PATENT DOCUMENTS

| | | | | |
|---|---|---|---|---|
| 5,043,868 A | * | 8/1991 | Kitamura et al. | ........... 712/218 |
| 5,123,108 A | * | 6/1992 | Olson et al. | ................. 712/218 |
| 5,313,551 A | | 5/1994 | Labrousse | |
| 5,467,476 A | * | 11/1995 | Kawasaki | .................... 712/23 |
| 5,619,668 A | * | 4/1997 | Zaidi | .......................... 712/200 |
| 5,638,526 A | | 6/1997 | Nakada | |
| 5,764,943 A | | 6/1998 | Wechsler | |
| 5,805,852 A | | 9/1998 | Nakanishi | |
| 5,826,069 A | * | 10/1998 | McCullough et al. | ........ 712/220 |
| 5,970,241 A | * | 10/1999 | Deao et al. | .................. 712/227 |
| 6,170,051 B1 | * | 1/2001 | Dowling | ...................... 712/225 |
| 6,266,766 B1 | * | 7/2001 | O'Connor | .................... 712/217 |
| 6,382,846 B1 | * | 5/2002 | Lai et al. | ..................... 712/209 |

FOREIGN PATENT DOCUMENTS

EP 0 767 425 A 4/1997

OTHER PUBLICATIONS

Computer Organization and Design—The Hardware/Software Interface, 2nd Edition, John L. Hennessy and David A. Patterson, Morgan Kaufmann Publishers, 1998; p. 452.*
Computer Architecture: a Quantitative Approach, 2nd Edition, John L. Hennessy and David A. Patterson, Morgan Kaufmann Publishers, 1996; p. 188.*

* cited by examiner

Primary Examiner—Eddie Chan
Assistant Examiner—Shane F Gerstl
(74) Attorney, Agent, or Firm—Robert D. Marshall, Jr.; W. James Brady, III; Frederick J. Telecky, Jr.

(57) ABSTRACT

A data processing apparatus includes first (78) and second (80) functional unit groups, each includes a plurality of functional units and a register file (76) comprising a plurality of registers. A comparator (181) receives the operand register number of a current instruction for a functional unit in the first functional unit group, and the destination register number of an immediately preceding instruction for the second functional unit group. A register file bypass multiplexer (174) selects the data from the register corresponding to the operand number of the current instruction on no match and selects the output of the second functional unit group (hotpath 172) if the comparator indicates a match. The first functional unit utilizes the output of the second functional unit group without waiting for the result to be stored in the register file.

25 Claims, 19 Drawing Sheets

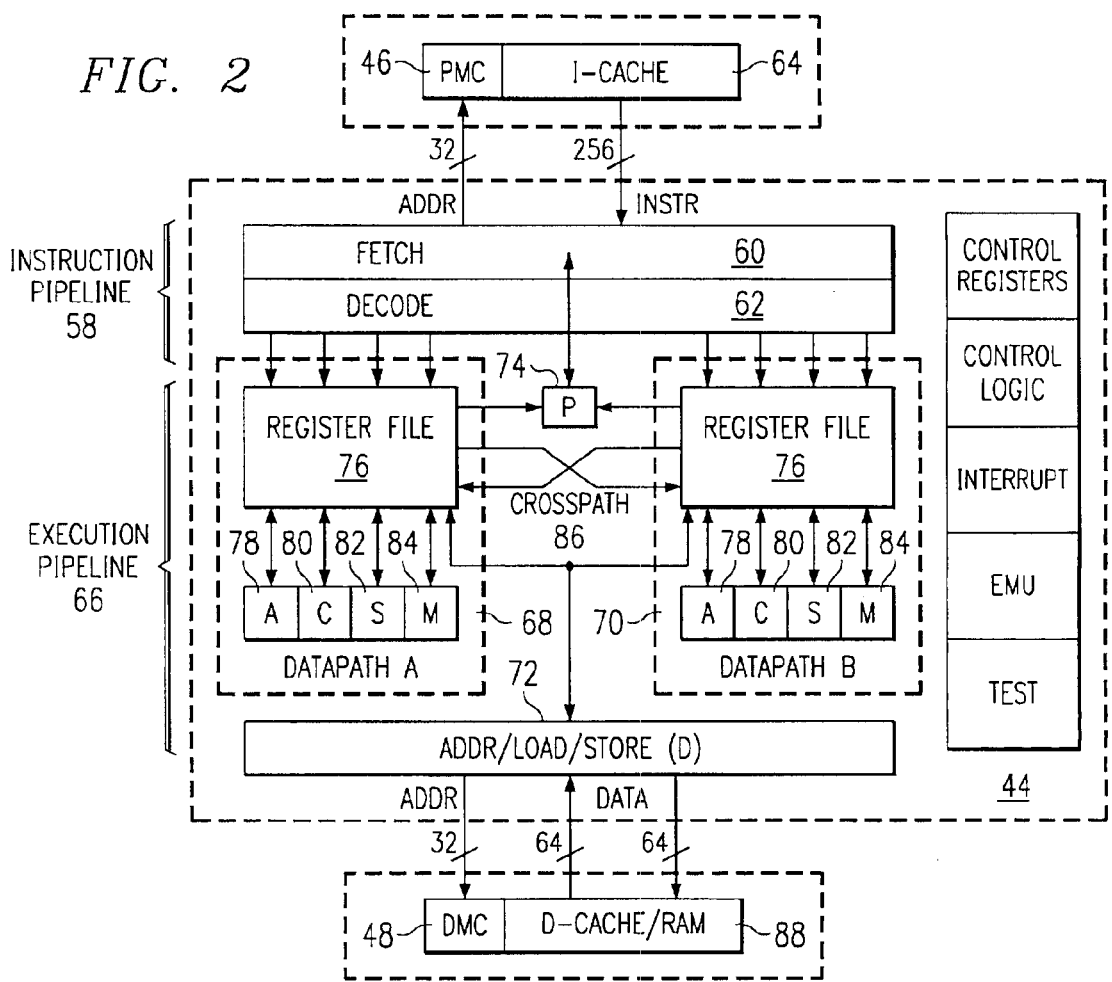

FIG. 2

| UNIT GROUP | OPERATIONS | REGISTER FILE ACCESS | |
|---|---|---|---|
| | | PRIMARY DATAPATH | ALTERNATIVE DATAPATH |
| A | - GENERAL ARITHMETIC<br>- BOOLEAN AND CONTROL REGISTER ACCESS | R/W | R |
| C | - COMPARE, SHIFT, BOOLEAN<br>- ARITHMETIC: ADD, SUB | R/W | R |
| S | - SHIFT, ROTATE, EXTENDED BOOLEAN<br>- ARITHMETIC: ADD, SUB | R/W | R |
| M | - MULTIPLY<br>- ARTHMETIC: ADD, SUB | R/W | R |
| D | - LOAD<br>- STORE<br>- ADDRESS COMPUTATION | W TO BOTH<br>R FROM BOTH<br>R/W BOTH | |
| P | - BRANCH | R FROM BOTH | |

FIG. 3      R=READ, W=WRITE

| STAGE | FUNCTION |
|---|---|
| F0 | SEND PC TO PROGRAM MEMORY CONTROLLER. LDIP ASSIGNED. |
| F1 | CACHE BLOCK SELECT. |
| F2 | ADDRESS PHASE OF INSTRUCTION CACHE ACCESS. |
| F3 | DATA PHASE OF INSTRUCTION CACHE ACCESS. |
| F4 | FETCH PACKET SENT TO DSP. |

*FIG. 5a*

| STAGE | FUNCTION |
|---|---|
| D0 | DETERMINE VALID INSTRUCTIONS IN CURRENT FETCH PACKET. |
| D1 | SORTS INSTRUCTIONS IN EXECUTE PACKET ACCORDING TO DESTINATION UNITS. |
| D2 | INSTRUCTIONS SENT TO DESTINATION UNITS. CROSSPATH REGISTER READS OCCUR. |
| D3 | UNITS DECODE INSTRUCTIONS. REGISTER FILE READ (2ND PHASE). |

*FIG. 5b*

| UNIT | STAGE | FUNCTION |
|---|---|---|
| NON M UNIT | E | EXECUTION OF OPERATION BEGINS AND COMPLETES. FULL RESULT AVAILABLE AT END OF CYCLE. |
| M UNIT | M0 | EXECUTION OF MULTIPLY OPERATION BEGINS. (OR, NON-MULTIPLY OPERATION BEGINS AND COMPLETES.) |
| M UNIT | M1 | MULTIPLY OPERATION CONTINUES. (OR, NON-MULTIPLY RESULT WRITTEN TO REGISTER FILE (PHASE 1).) |
| M UNIT | M2 | MULTIPLY OPERATION COMPLETES. |

*FIG. 5c*

| STAGE | FUNCTION |
|---|---|
| E | ADDRESS GENERATION OCCURS. REGISTER FILE ACCESS FOR READ DATA. |
| L0 | LOAD ADDRESS GENERATED DURING E IS SENT TOWARDS THE DMC. |
| L1 | ADDRESS DECODE, TC ARBITRATION, TAG COMPARES. |
| L2 | ADDRESS DECODE, TC ARBITRATION, TAG COMPARES. |
| L3 | ADDRESS PHASE OF DATA CACHE ACCESS. |
| L4 | DATA PHASE OF DATA CACHE ACCESS. |
| L5 | 64-BIT DATA SENT TO DSP. |

*FIG. 5d*

| STAGE | FUNCTION |
|---|---|
| E | ADDRESS GENERATION OCCURS. REGISTER FILE ACCESS FOR WRITE DATA. |
| S0 | ADDRESS SENT TO DMC. |
| S1 | ADDRESS DECODE IN DMC. WRITE DATA ALIGNMENT. |
| S2 | TAG COMPARE IN DMC. WRITE DATA SENT TO DMC. |
| S3 | ADDRESS PHASE IN DATA CACHE. |
| S4 | DATA PHASE IN DATA CACHE. |

*FIG. 5e*

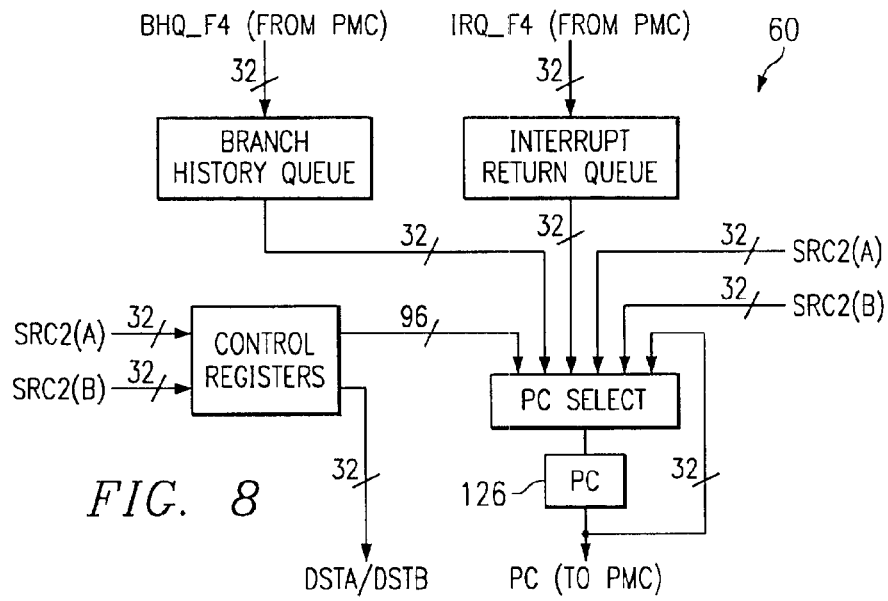

FIG. 8

| || [PREDICATION REG] INSTRUCTION_MNEMONIC .UNIT-DATAPATH-CROSSPATH OP1, OP2, DST |
|---|

WHERE:
|| = TO BE SCHEDULED IN PARALLEL WITH PRECEDING INSTRUCTION(S)
[PREDICATION REG] = REGISTER CONTAINING PREDICATION VALUE
.UNIT = A,C,S,M,D,P UNIT GROUPS
DATAPATH = 1 FOR DATAPATH A, 2 FOR DATAPATH B
CROSSPATH = X IF ONE OPERAND COMES FROM OPPOSITE REGISTER FILE
OP1, OP2 = SOURCE REGISTERS
DST = DESTINATION REGISTER

| UNIT GROUP | ASSEMBLY NOTATIONS | | ASSEMBLY EXAMPLES | WITH CROSSPATH |
|---|---|---|---|---|
| | DATAPATH A | DATAPATH B | | |
| A | .A1 | .A2 | ADD .A1 A1,A2,A3<br>SUB .A2 B1,B2,B3 | ADD .A1X A1,B2,A3<br>SUB .A2X B1,A2,B3 |
| C | .C1 | .C2 | CMPEQ .C1 A1,A2,A3<br>CMPEQ .C2 B1,B2,B3 | CMPEQ .C1X A1,B2,A3<br>CMPEQ .C2X B1,A2,B3 |
| S | .S1 | .S2 | SHL .S1 A1,A2,A3<br>SHL .S2 B1,B2,B3 | SHL .S1X A1,B2,A3<br>SHL .S2X B1,A2,B3 |
| M | .M1 | .M2 | MPY .M1 A1,A2,A3<br>MPY .M2 B1,B2,B3 | MPY .M1X A1,B2,A3<br>MPY .M2X B1,A2,B3 |
| D | .D | | LDB .D *A8,A12<br>STB .D A8,*A12<br>ADDAH .D A8,A2,B1 | n/a |
| P | .P | | B A8 | n/a |

FIG. 15

|  |  | SOURCE(S) DATA PATH | | | | | |
|---|---|---|---|---|---|---|---|
|  |  | A,C,S | M (ADD) | M (MUL) | D (LOAD) | D (STORE) | D (ADDR) |
| SINK(S) IN SAME DATAPATH | A,C,S | 0 | 1 | 3 | 7 | - | 1 |
|  | M | 1 | 1 | 3 | 7 | - | 1 |
|  | D (LOAD) | - | - | - | - | 0 | - |
|  | D (STORE) | 0 | 0 | 2 | 6 | - | 0 |
|  | D (ADDR:BASE) | 1 | - | 3 | 7 | - | 0 |
|  | D (ADDR:OFFSET) | 1 | - | 3 | 7 | - | 1 |
|  | P | 0 | 1 | 3 | 7 | - | 1 |
|  | PREDICATION | 0 | - | 2 | 6 | - | 0 |
| SINK(S) IN OPPOSITE DATAPATH | A,C,S | 1 | 2 | 4 | 8 | - | 2 |
|  | M | 1 | 2 | 4 | 8 | - | 2 |
|  | PREDICATION | 0 | - | 2 | 6 | - | 0 |

US 6,839,831 B2

DATA PROCESSING APPARATUS WITH REGISTER FILE BYPASS

FIELD OF THE INVENTION

This invention relates to data processing devices, electronic processing and control systems and methods of their manufacture and operation.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. The increasing demands of technology and the marketplace make desirable even further structural and process improvements in processing devices, application systems and methods of operation and manufacture.

SUMMARY OF THE INVENTION

In accordance with a preferred embodiment of the invention, there is disclosed a data processing apparatus which increases the speed of data transfer from one processor instruction to another processor instruction. The apparatus comprises a register file comprising a plurality of registers, each of the plurality of registers having a corresponding register number, a first functional unit group connected to the register file and including a plurality of first functional units, and a second functional unit group connected to the register file and including a plurality of second functional units. The first functional unit group is responsive to an instruction to receive data from one of the plurality of registers corresponding to an instruction-specified first operand register number at a first operand input, operate on the received data employing an instruction-specified one of the first functional units, and output data to one of the plurality of registers corresponding to an instruction-specified first destination register number from a first output. The second functional unit group is responsive to an instruction to receive data from one of the plurality of registers corresponding to an instruction-specified second operand register number at a second operand input, operate on the received data employing an instruction-specified one of the second functional units, and output data to one of the plurality of registers corresponding to an instruction-specified second destination register number from a second output. The apparatus further comprises a first comparator receiving an indication of the first operand register number of a current instruction and an indication of the second destination register number of an immediately preceding instruction, the first comparator indicating whether the first operand register number of the current instruction matches the second destination register number of the immediately preceding instruction. The apparatus further comprises a first register file bypass multiplexer connected to the register file, the first functional unit group, the second functional unit group and the first comparator having a first input receiving data from the register corresponding to the first operand register number of the current instruction, a second input connected to the second output of the second functional unit group and an output supplying an operand to the first operand input of the first functional unit group. The first multiplexer selects the data from the register corresponding to the first operand number of the current instruction if the first comparator fails to indicate a match and selects the second output of the second functional unit group if the first comparator indicates a match. In a further embodiment, the register file, the first functional unit group, the second functional unit group, the first comparator and the first register file bypass multiplexer operate according to an instruction pipeline comprising a first pipeline stage consisting of a register read operation from the register file and a first half of operation of a selected functional unit of the first and the second functional unit groups, and a second pipeline stage consisting of a second half of operation of the selected functional unit of the first and the second functional unit groups and a register write operation to the register file, wherein the sum of the time of the register read operation and the register write operation equals approximately the sum of the time of the first and second halves of operation of a slowest of the functional units of the first and second functional unit groups.

In accordance with another preferred embodiment of the invention, there is disclosed a data processing apparatus. The apparatus comprises first and second register files each comprising a plurality of registers, each of the plurality of registers having a corresponding register number; a first functional unit group including an input connected to the first and second register files, an output connected to the first register file, and a plurality of first functional units; a second functional unit group including an input connected to the first and second register files, an output connected to the second register file, and a plurality of second functional units; and a first crosspath connecting the second register file to the first functional unit group. The first functional unit group is responsive to an instruction to receive data from one of the plurality of registers in the first and second register files corresponding to an instruction-specified first operand register number at a first operand input, operate on the received data employing an instruction-specified one of the first functional units, and output data to one of the plurality of registers in the first register file corresponding to an instruction-specified first destination register number from a first output. The second functional unit group is responsive to an instruction to receive data from one of the plurality of registers in the first and second register files corresponding to an instruction-specified second operand register number at a second operand input, operate on the received data employing an instruction-specified one of the second functional units, and output data to one of the plurality of registers in the second register file corresponding to an instruction-specified second destination register number from a second output. The first crosspath comprises a first crosspath comparator and a first crosspath multiplexer. If the first operand register is in the second register file, the comparator receives an indication of the first operand register number of a current instruction and an indication of the second destination register number of a preceding instruction, and the first crosspath comparator indicates whether the first operand register number of the current instruction matches the second destination register number of the preceding instruction. The first crosspath multiplexer is connected to the second register file, the first functional unit group, the second functional unit group and the first crosspath comparator, and has a first input receiving data from the register corresponding to the first operand register number of the current instruction, a second input connected to the second output of the second functional unit group and an output supplying an operand to the first operand input of the first functional unit group. If the first operand register is in the second register file, the first crosspath multiplexer selects the data from the register corresponding to the first operand number of the current instruction if the first crosspath comparator fails to indicate a match and selects the second output of the second functional unit group if the first crosspath comparator indicates a match. In a further embodiment, the first crosspath further comprises a first crosspath register latching the crosspath multiplexer's output for the first functional unit group's first operand input. In another embodiment the data processing apparatus further comprises a second crosspath connecting the first register file to the second functional unit group.

An advantage of the inventive concepts is that the first functional unit utilizes the second functional unit group's second output without waiting for the result to be stored in the register file, thus avoiding excess delay slots in the instruction pipeline.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 2 is a top-level block diagram of a DSP cluster from the microprocessor of FIG. 1;

FIG. 3 is a chart of the resource availability and register file access for the datapath unit groups in the DSP cluster of FIG. 2;

FIGS. 5a, 5b, 5c, 5d and 5e are charts illustrating the functions of each stage of the pipelines of FIG. 4;

FIG. 8 is a block diagram of the fetch unit of the DSP core of FIG. 2;

FIG. 15 is a chart of the basic assembly format for DSP core instructions;

DETAILED DESCRIPTION OF THE PREFERRED EMBODIMENTS

Figure 1:
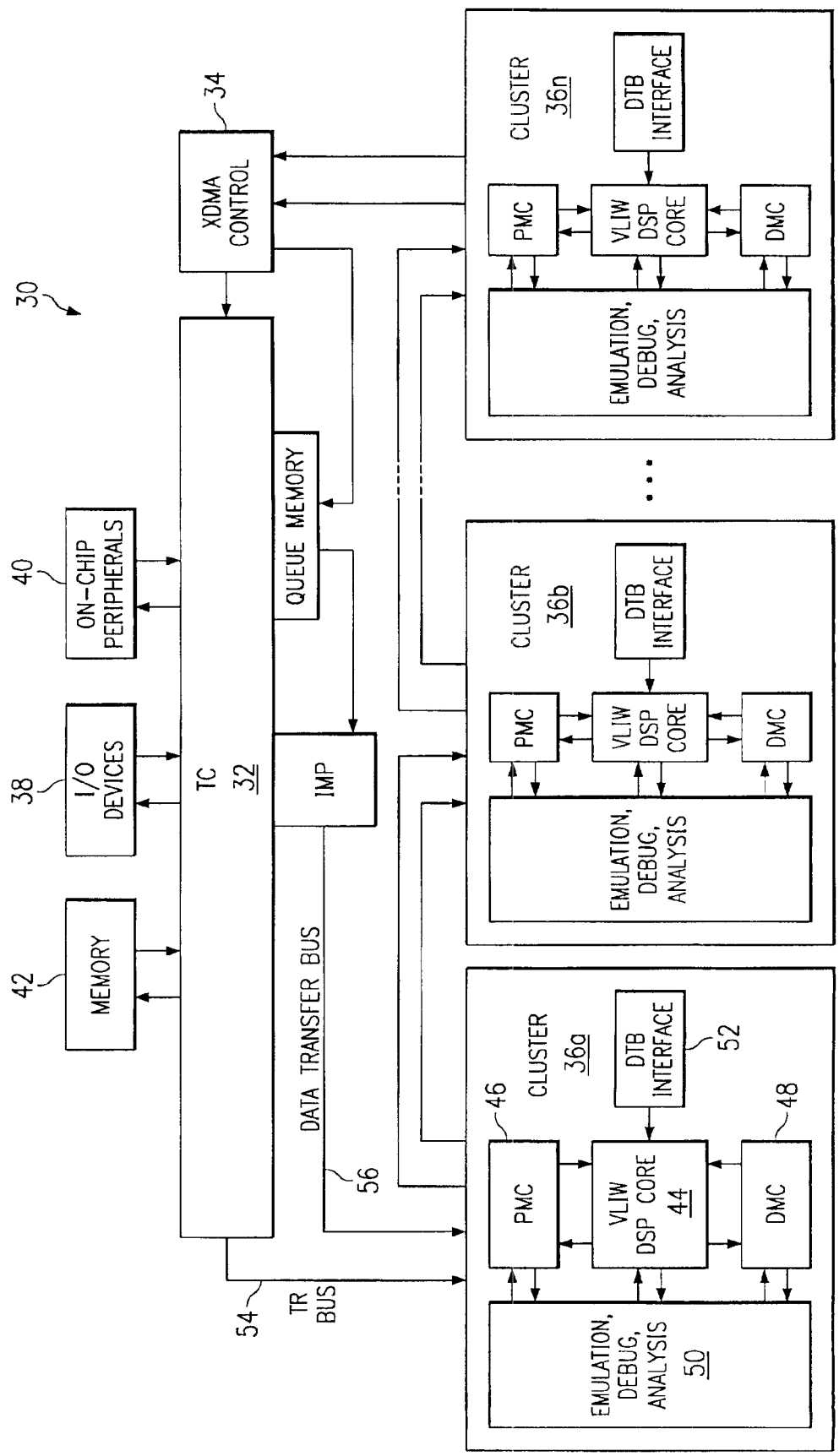
FIG. 1 is a top-level block diagram of a microprocessor.

According to a preferred embodiment of the present invention, a microprocessor architecture is provided including certain advantageous features. FIG. 1 is a high-level block diagram of an exemplary microprocessor in which a preferred embodiment of the invention is presented. In the interest of clarity, FIG. 1 shows only those portions of microprocessor 30 that may be relevant to an understanding of an embodiment of the present invention. Details of the general construction of microprocessors are well known, and may be found readily elsewhere. For example, U.S. Pat. No. 5,072,418 issued to Frederick Boutand, et al., describes a DSP in detail and is incorporated herein by reference. Details of portions of microprocessor 30 relevant to an embodiment of the present invention are explained in sufficient detail below so as to enable one of ordinary skill in the microprocessor art to make and use the invention.

Generally, microprocessor 30 comprises Transfer Controller (TC) 32, External Direct Memory Access (XDMA) Controller 34, and DSP clusters 36a–36n. Transfer Controller 32 provides for all data communication among DSP clusters 36a–36n, external input/output (I/O) devices 38, on-chip peripherals 40, and memory 42. While any given cluster such as DSP cluster 36a can access its own internal local memory within the cluster without permission from TC 32, any access to global memory outside of its local memory requires a TC directed data transfer, whether the access is to external memory or to another DSP cluster's own local memory. XDMA Controller 34 provides handling of externally initiated DMA requests while avoiding interrupting any DSP clusters 36a–36n. Each DSP cluster 36 comprises a very long instruction word (VLIW) DSP core 44, Program Memory Controller (PMC) 46, Data Memory Controller (DMC) 48, an emulation, analysis and debug block 50, and Data Transfer Bus (DTB) interface 52. DSP clusters 36 and TC 32 communicate over a pair of high throughput buses: Transfer Request (TR) bus 54, which is used to specify and request transactions in TC 32, and DTB 56, which is used to load and store data from objects in the global memory map. The overall architecture is scaleable, allowing for the implementation of up to 255 DSP clusters 36, although three DSP clusters 36 is currently the preferred embodiment. It should be noted that architectural details, such as the number of DSP clusters 36, and instruction set details are not essential to the invention. The microprocessor architecture outlined in FIG. 1 is exemplary only, and the invention is applicable to many microprocessor architectures.

FIG. 2 is a high-level block diagram illustrating more detail of DSP core 44. DSP core 44 is a 32-bit eight-way VLIW pipelined processor. The instruction set consists of fixed length 32-bit reduced instruction set computer (RISC) type instructions that are tuned for DSP applications. Almost all instructions perform register-to-register operations, and all memory accesses are performed using explicit load/store instructions. As shown in FIG. 2, instruction pipeline 58 consists of fetch stage 60 and decode stage 62. Fetch stage 60 retrieves program codes into the processor core from instruction cache 64 in groups of eight instructions called a fetch packet. Decode stage 62 parses the fetch packet, determines parallelism and resource availability, and constructs an execute packet of up to eight instructions. Each instruction in the execute packet is then translated into control signals to drive the appropriate units in execution pipeline 66. Execution pipeline 66 consists of two symmetrical datapaths, datapath A 68 and datapath B 70, a common 64-bit load/store unit group, D-unit group 72, and a common branch unit group, P-unit group 74. Each datapath contains 32-word register file (RF) 76, and four execution unit groups, A-unit group 78, C-unit group 80, S-unit group 82, and M-unit group 84. Overall there are ten separate unit groups in execution pipeline 66, of which eight may scheduled concurrently every cycle. Each functional unit group contains plural functional units, some of which are duplicated between unit groups. In total there are nine 32-bit adders, four 32-bit shifters, three Boolean operators, and two 32×16 multipliers. The multipliers are each configurable into two 16×16 or four 8×8 multipliers.

FIG. 3 is a chart summarizing the resource availability and register accessibility for all of the functional unit groups in execution pipeline 66. Upon receiving control signals from decode stage 62, source operands are read from register file(s) 76 and sent to the execution unit groups. A summary of the types of operations performed by each unit group are listed in the Operations column in FIG. 3. The unit groups' access to the two register files in DSP core 44 is summarized in the Register File Access column in FIG. 3. Each datapath-specific unit group has direct read-access to its own register file (primary datapath), and may also read the other register file (alternative datapath) via read-only crosspath 86, shown in FIG. 2. The execution unit groups then carry out the operations and write back the results into their respective register file. There is no write access to the other datapath's register file for the datapath-specific unit groups. D-unit group 72 performs address computation, and has read/write access to both register files 76 and interfaces with data cache/random access memory (RAM) 88 via a 32-bit address bus and 64-bit data bus. P-unit group 74 handles branching and other program control flow, and has read access to both register files 76.

Figure 4:
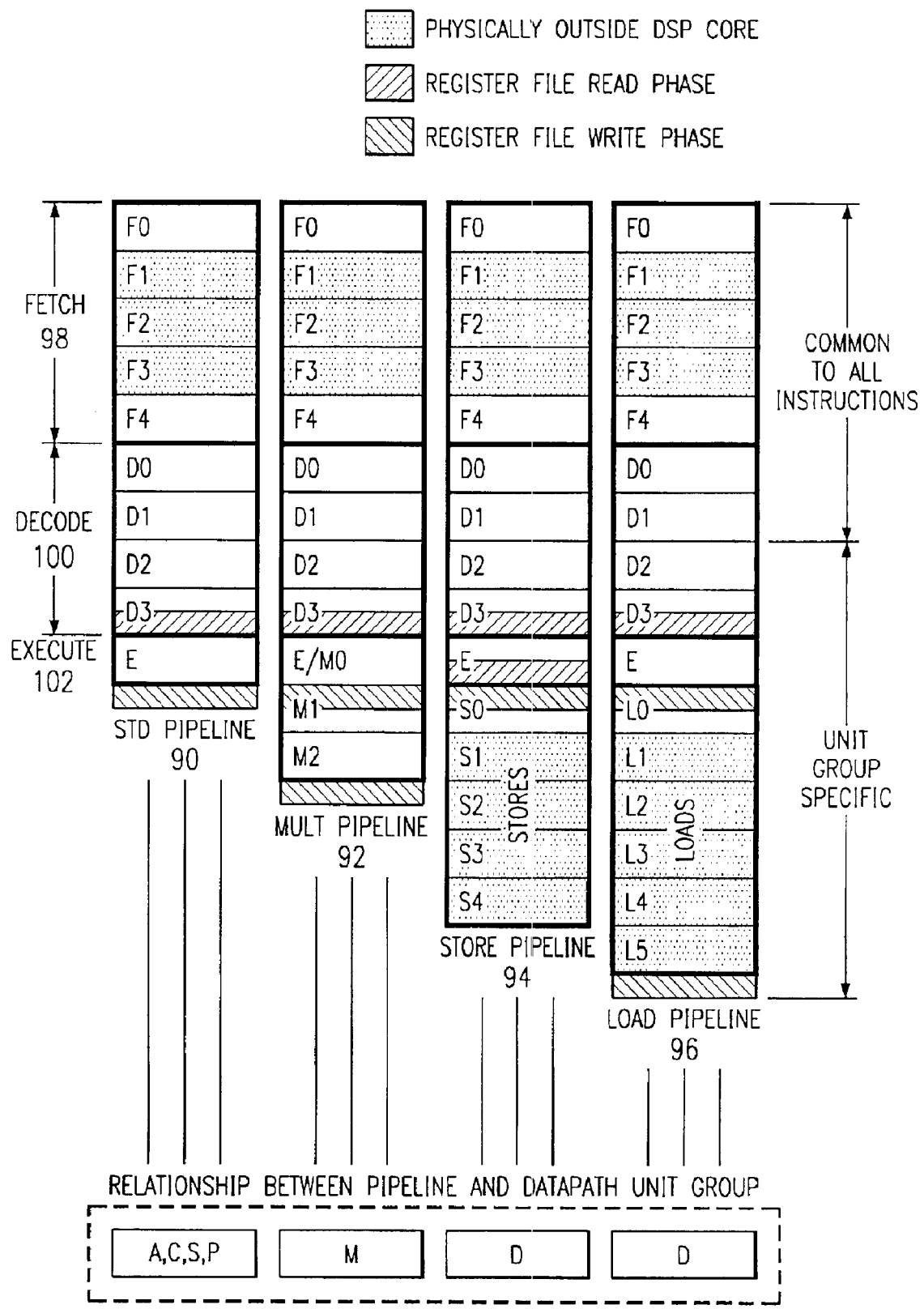
FIG. 4 is a chart of the DSP pipeline depth of the DSP core within the DSP cluster of FIG. 2.

DSP core 44 of FIG. 2 comprises a deep pipeline with minimal hardware logic control, thus facilitating high clock speeds and high data throughput, and providing a high degree of instruction execution control at the programming level. The DSP hardware does not manage data dependencies (e.g., read-before-write, write collision, etc.), therefore it is the compiler's or assembler's responsibility to take delay-slot requirements into account in instruction scheduling. FIG. 4 illustrates the four pipeline types utilized by DSP core 44: standard pipeline 90, used by the A-, C-, S-, and P-unit groups; multiply pipeline 92, used by the M-unit group; store pipeline 94, used by the D-unit group; and load pipeline 96, also used by the D-unit group. The pipeline depth varies from 10 stages for standard pipeline 90, to 13 stages for multiply pipeline 92, to 15 stages for store pipeline 94, and up to 16 stages for load pipeline 96. An operation advancing down the pipeline advances one stage every CPU cycle, which refers to the period during which an execute packet occupies any given execute stage. A CPU cycle equates to a clock cycle when there are no stalls. Conceptually, the DSP pipeline may be partitioned into two main pipelines, the instruction pipeline and the execution pipeline. The instruction pipeline is common to all instructions and includes the 5-stage instruction fetch function 98, and the 4-stage decode/dispatch function 100. The depth and functionality of execution pipeline 102 is instruction dependent. For example, non-multiply operations performed in the M-unit group do not require the deep pipeline necessary for multiply operations, so the results of these operations are available for write-back in stage M1. Similarly, the results of address math operations performed in the D-unit group are written to the register file at the end of stage E. Thus, even though these example instructions are performed by the M- and D-unit groups, respectively, their pipelines appear to be that of the standard pipeline.

Charts outlining the functions of each pipeline stage are shown in FIGS. 5a–5e. Fetch stages F0–F4 are listed in FIG. 5a. Most fetch stages occur outside the DSP core itself.

Stage F0 initiates the fetch cycle by sending the program counter (PC) value to PMC 46. Stages F1, F2 and F3 occur outside DSP core 44 in PMC 46, with the new fetch packet being received by DSP core 44 at the end of stage F4. FIG. 5b lists decode stages D0–D3. Stages D0 and D1 are common to all execution unit groups and operate on every instruction executed by DSP core 44. Stage D0 determines the validity of instructions in the current fetch packet and determines the next fetch packet. Stage D1 sorts the current execution packet instructions by unit group. The current execution packet is then sent to the destination pipeline/unit group during stage D2. In stage D3, units decode received instructions, unit level control signals are generated, and register file access is performed.

The P-unit group is not datapath specific, but the branching pipeline operates like the A-, C-, and S-unit groups in that it has a single execution stage, with data being written to the program counter in the same write phase as the standard pipeline. The program counter is updated at the end of stage E, implying that the next CPU cycle will be stage F0 for the new address. This means that from the point a branch instruction is in stage E, there are ten CPU cycles until execution begins with instructions from the new address.

FIG. 5c lists execution stages E and M0–M2. Execution for non-multiply operations is performed in a single execute cycle, E. These include non-multiply arithmetics, Boolean operations, shifts, packs/unpacks, and address calculations. An extended execution pipeline, stages M0–M2, is provided for multiply operations due to their complexity. Functionally, stage M0 corresponds to stage E. Stages M1–M2 are required by the time necessary to perform a worst case 32 bit×16 bit multiply. The increased latency forces three delay slots on multiply operations. M-unit group 84 performs all multiply operations. Additionally, M-unit group 84 performs a few non-multiply instructions, which complete in stage M0.

FIG. 5d lists load stages L0–L5, and FIG. 5e lists store stages S0–S4. D-unit group 72 which performs these operations is not datapath specific, so datapaths A 68 and B 70 share a single load/store interface between them. Load/store operations are up to 64 bits wide and may reference the register file of either datapath. Address calculations for load/store operations complete in stage E. The generated address is then sent to DMC 48 in stage L0/S0. The load and store stages begin to differ at this point. For data loads, address decode takes two stages, L1 and L2. Address and data phases of data cache access occur in stages L3 and L4, and then read data is sent to DSP core 44 in stage L5 to complete the load. For data stores, address decode takes one stage, S1. Write data is sent to DMC 48 in stage S2, and then address and data phases of data cache access occur in stages S3 and S4 to complete the store.

Figure 6A:
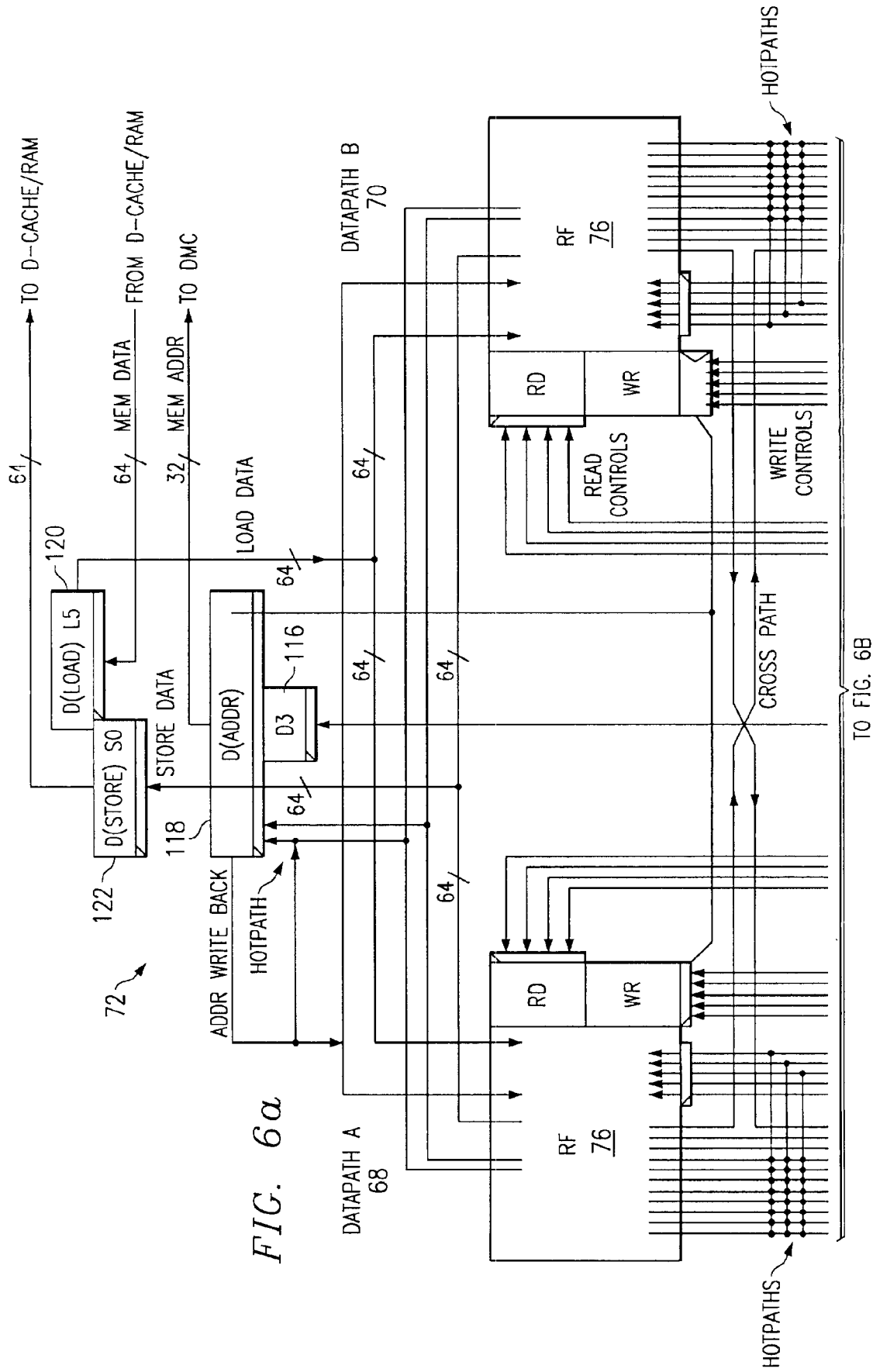
FIGS. 6a and 6b are a block diagram of the top-level buses of the pipeline of the DSP core of FIG. 2.
Figure 6B:
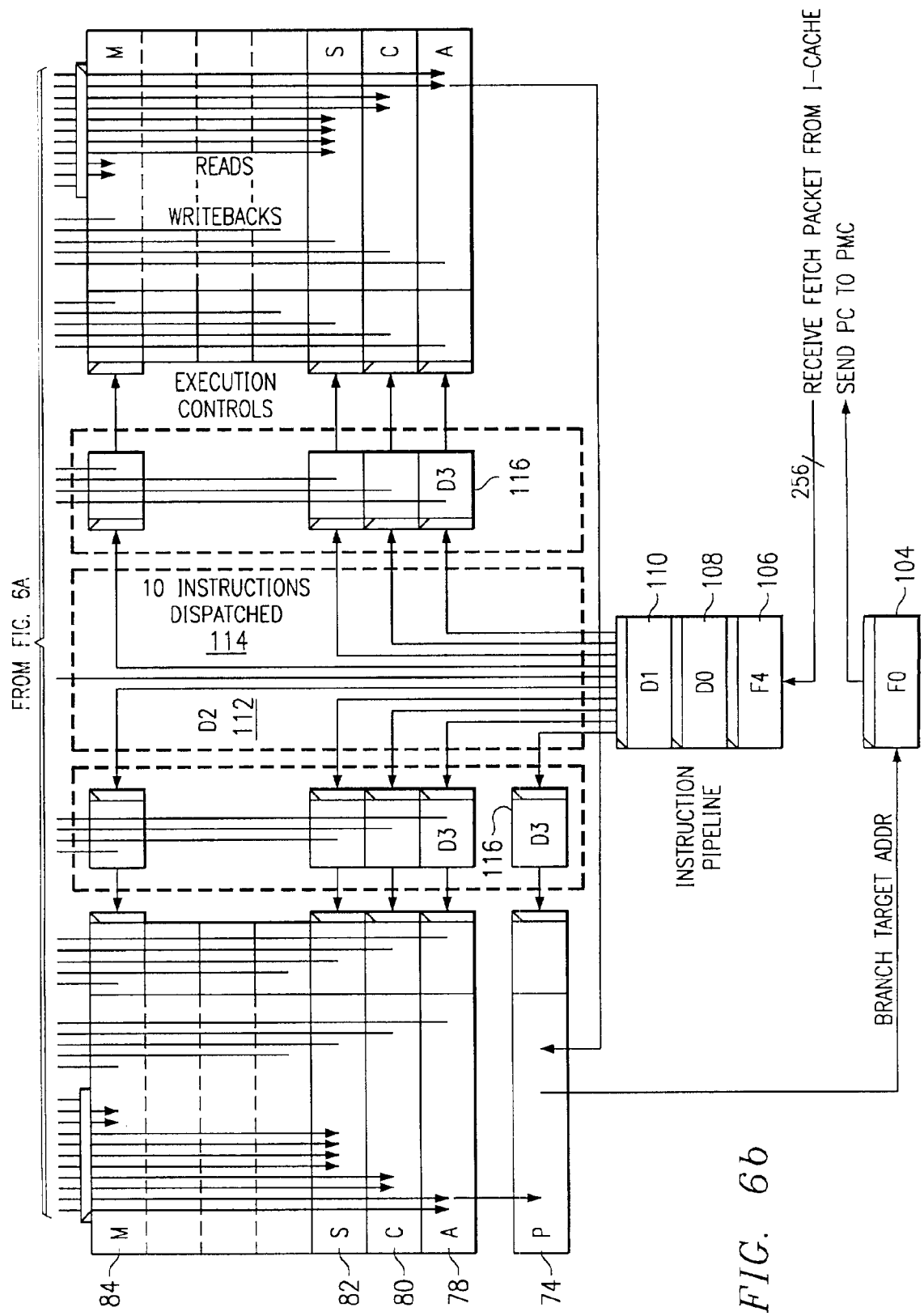
Figure 7:
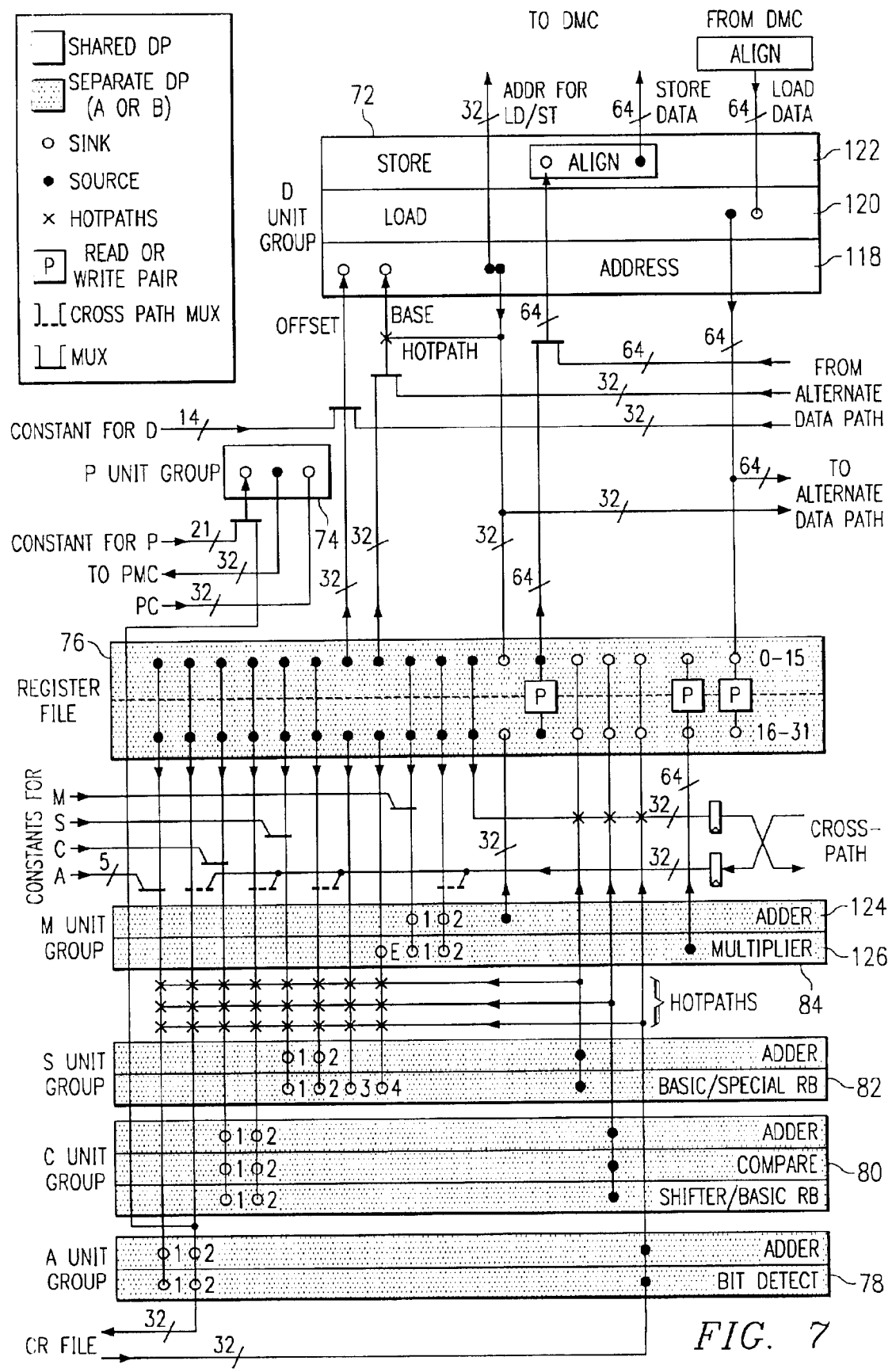
FIG. 7 is a block diagram of the datapath in the execution pipeline of the DSP core of FIG. 2.

FIGS. 6a, 6b and 7 illustrate the functionality of the instruction and execution pipelines in more detail. FIGS. 6a and 6b are the two halves of a block diagram of the top-level buses of the DSP core pipeline. The instruction pipeline, serving as the front end of DSP core 44, fetches instructions into the processor from PMC 46 and feeds the execution engines. Stage F0 104 resides in DSP core 44, and contains the program counter and branching control. Stages F1, F2 and F3 (not shown) reside in PMC 46, where memory addresses are decoded and cache accesses are performed. Stage F4 106 is reserved solely for the transport of the 256-bit fetch packet from PMC 46 to the DSP core 44. Stages D0 108 and D1 110 are used to parse the fetch packet and to assign individual 32-bit instructions to appropriate execute unit groups. Stage D2 112 is reserved solely for the transport of these instructions to the execute unit groups. There are physically 10 instruction buses 114 sent to stage D3 116, which are distributed locally to the execute unit groups: one bus to each A-78, C-80, S-82, and M-unit group 84, in each datapath 68 and 70, one bus to P-unit group 74, and one bus to D-unit group 72. Only a maximum of 8 instructions, however, may be dispatched to the execute pipeline in a given cycle. Stage D3 116 houses the final decoders which translate instruction opcodes into specific control signals to drive the respective execute unit groups. Stage D3 116 is also where register file 76 is accessed for operands.

Continuing from stage D3 116, the execute pipeline splits off into the two main datapaths, A 68 and B 70, each containing four execute unit groups, A 78, C 80, S 82, M 84, and register file 76. A unit group 78, C unit group 80, and S unit group 82 are 32-bit datapath hardware that perform single-cycle general arithmetic, shifting, logical and Boolean operations. M unit group 84 contains 2 functional units: a single-cycle 32-bit adder and a three-stage 64-bit multiplier. The execute pipeline also contains D unit group 72 and P unit group 74, each of which serves both datapaths.

D-unit group 72 has 3 functional units: single-cycle 32-bit address generator 118, 64-bit load unit 120 and 64-bit store unit 122. Address generator 118 functions in the pipeline as an execute unit similar to the A, C and S unit groups. Load unit 120 has 6 pipeline stages. Memory addresses computed by address generator 118 and load commands are formatted by load unit 120 and sent to DMC 48 in stage L0. DMC 48 uses stages L1, L2, L3 and L4 to decode memory addresses and perform cache access. Data alignment and zero/sign extension are done in stage L4. Stage L5 is reserved solely for data transport back to DSP core 44. Store unit 122 has 5 pipeline stages. Similar to load unit 120 operation, addresses and store commands are sent to DMC 48 in stage S0. The data to be stored is read out from register file 76 one cycle earlier in stage E, at the same time the address is being generated. The store data is also sent to DMC 48 in the same cycle as addresses and commands in stage S0. DMC 48 uses stages S1, S2, S3 and S4 for address decode and cache access for storing data.

P-unit group 74 performs branch computation and is a special case. With respect to timing, P-unit group 74 resides in the execute pipeline just like the single cycle units A 78, C 80 and S 82. However, since the program counter and control registers are located within the fetch unit in stage F0 104, P-unit group 74 resides physically with the fetch unit.

FIG. 7 is a detailed block diagram of the execute pipeline datapath. For clarity, the structure and interconnection between shared D-unit group 72 and shared P-unit group 74 and only one of the two separate main datapaths (A-unit group 78, C-unit group 80, S-unit group 82, M-unit group 84) are described. As instructions arrive at stage D3 of the instruction pipeline, decode logic peels off source and destination register addresses for each of the execute unit groups and sends them to RF 76 to fetch operands. In case of instructions with cross-file operands, RF access is performed a cycle earlier in stage D2, and stage D3 is used for cross-file transport. In stage D3, the instruction opcode is also decoded into control signals. At the end of stage D3, operand data and control signals are set-up to be sent to the respective execute unit groups.

Register file 76 is constructed of 2 banks of sixteen 32-bit registers each. There are 12 read ports and 6 write ports. In order to supply the many execute resources in the datapath while conserving read/write ports, the two read ports for base and offset of D-unit group 72 are shared with source 3 and 4 of S-unit group 82. In other words, the lower 16 registers (0–15) only go to D-unit group 72, and the upper 16 registers (16–31) only go to S-unit group 82. Similarly, the write port for the address result from D-unit group 72 is shared with the adder result from M-unit group 84. The lower 16 registers only go to D-unit group 72 and the upper 16 registers only go to M-unit group 84.

There are 3 classes of operation in the execute stages: single-cycle, 3-cycle, and load/store multi-cycle. All operations in A unit group 78, C unit group 80, and S unit group 82, the add functional unit in M-unit group 82, and address generation in D-unit group 72 are single cycle. Multiply functions in M unit group 84 take 3 cycles. Load and store operations take 6 and 5 cycles, respectively, in case of cache hit. Cycle counts are longer and variable in case of cache miss, because off-chip memory latency depends on the system configuration.

A unit group 78 and C unit group 80 each have two operand ports, source 1 and 2, while S unit group 82 has 4 operand ports, source 1, 2, 3, 4. Normal operations in S unit group 82 only uses 2 ports, while other operations such as Extended Rotate Boolean (ERB) use all 4 ports. If a condition requiring forwarding of a result from preceding instruction is detected, the forwarded result is selected, otherwise the RF operand is selected. Then the execute hardware (e.g. adder, shifter, logical, Boolean) performs the instructed operation and latches the result at the end of the E stage. The result from any one of the A, C, or S unit groups can be forwarded to the operand port of any of the A, C, or S unit groups within the same datapath. Address generator 118 in D unit group 72 operates similarly to the A, C, and S unit groups, except that D unit group's address result is only hotpathed back to itself. Adder 124 in M unit group 84 is similar, except that it has no hotpath. M unit group 84 has 3 operand ports. Normal multiplication uses 2 sources, while the extended port, which is shared with source 4 of S unit group 82, is used for Extended Multiply (EMPY) instructions. Multiplier 126 in M unit group 84 has 3 pipeline stages and no hotpath. The first 2 stages perform array multiplication in a carry/sum format. The last stage performs carry propagate addition and produces up to a 64-bit result. The 64-bit result is written back to RF 76 in pairs. Galois multiply hardware resides in M-unit group 84 alongside the main multiplier array, and it also takes 3 cycles. P unit group 74 operates just like the A, C, and S unit groups, except that it has no hotpath and that its result is consumed by the program control logic in the fetch unit instead of being written back to RF 76. P unit group 74 only has one operand port which is shared with source 2 of A unit group 78, which precludes parallel execution of a branch instruction and any instruction in A unit group 78.

FIGS. 8 to 14 are block diagrams illustrating more detail of the operation and hardware configuration of each of the unit groups within the DSP core. FIG. 8 is a top level diagram of fetch unit 60, which consists primarily of Program Counter 126 and other components generally responsible for controlling program flow, and the majority of control registers not directly related to the operation of a specific unit. With respect to program flow, fetch unit 60 has two main modes of operation: normal (sequential) operation and branch operation. Additionally, fetch unit 60 must initiate any interrupt/exception handling, resets, and privilege-level changes for DSP core 44.

Figure 9:
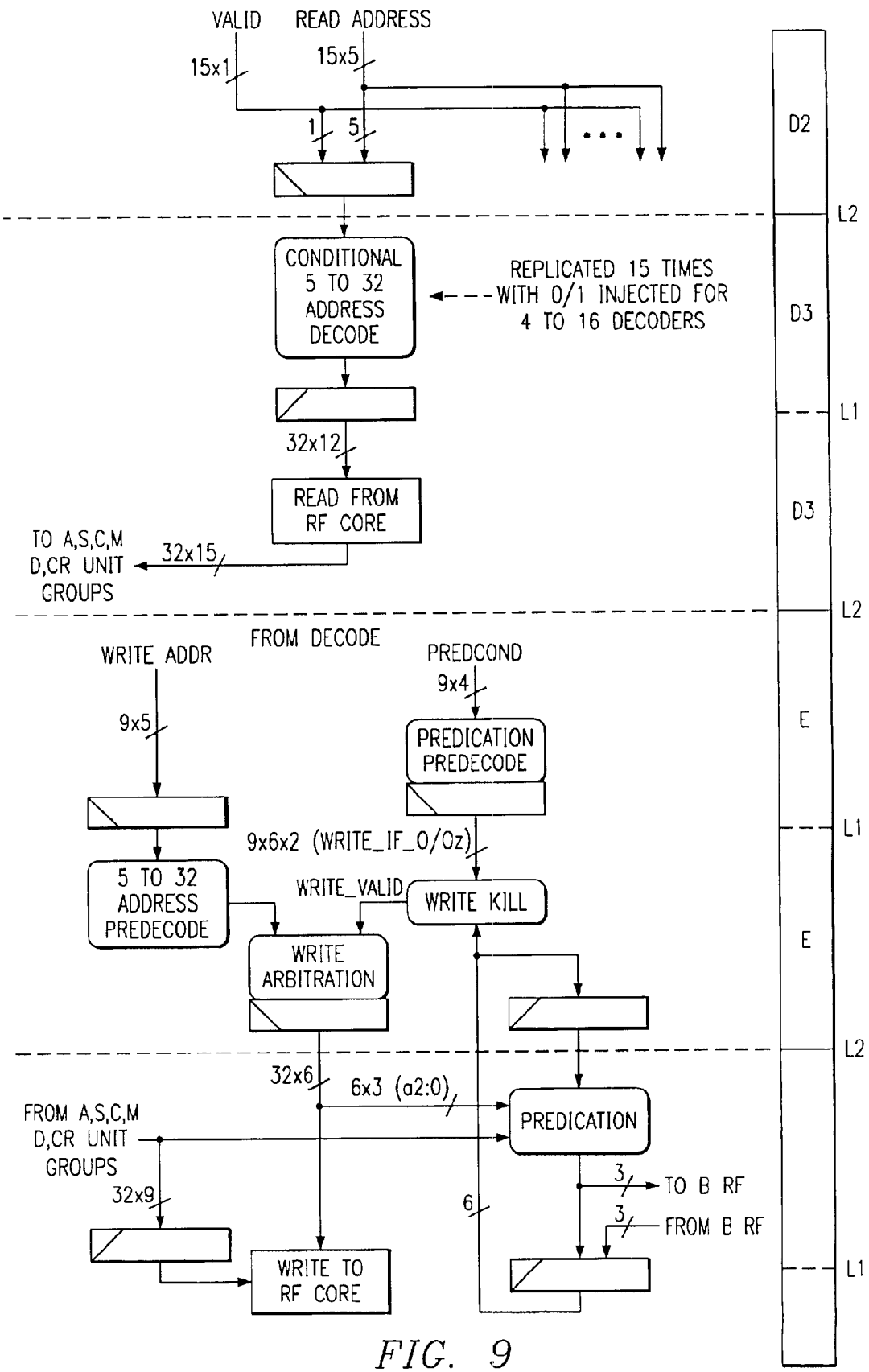
FIG. 9 is a block diagram of a register file of the DSP core of FIG. 2.

FIG. 9 is a top-level temporal block diagram of Register File 76. Within each DSP core 44 there are two datapaths, A 68 and B 70, each containing an identical register file. As used herein, the registers in the A (B) datapath are denoted by a0, . . . , a31 (b0, . . . , b31). Each register file 76 is composed of thirty-two 32-bit registers configured in upper and lower banks of 16 registers each. There are 12 read ports and 6 write ports for each register file 76.

Figure 10:
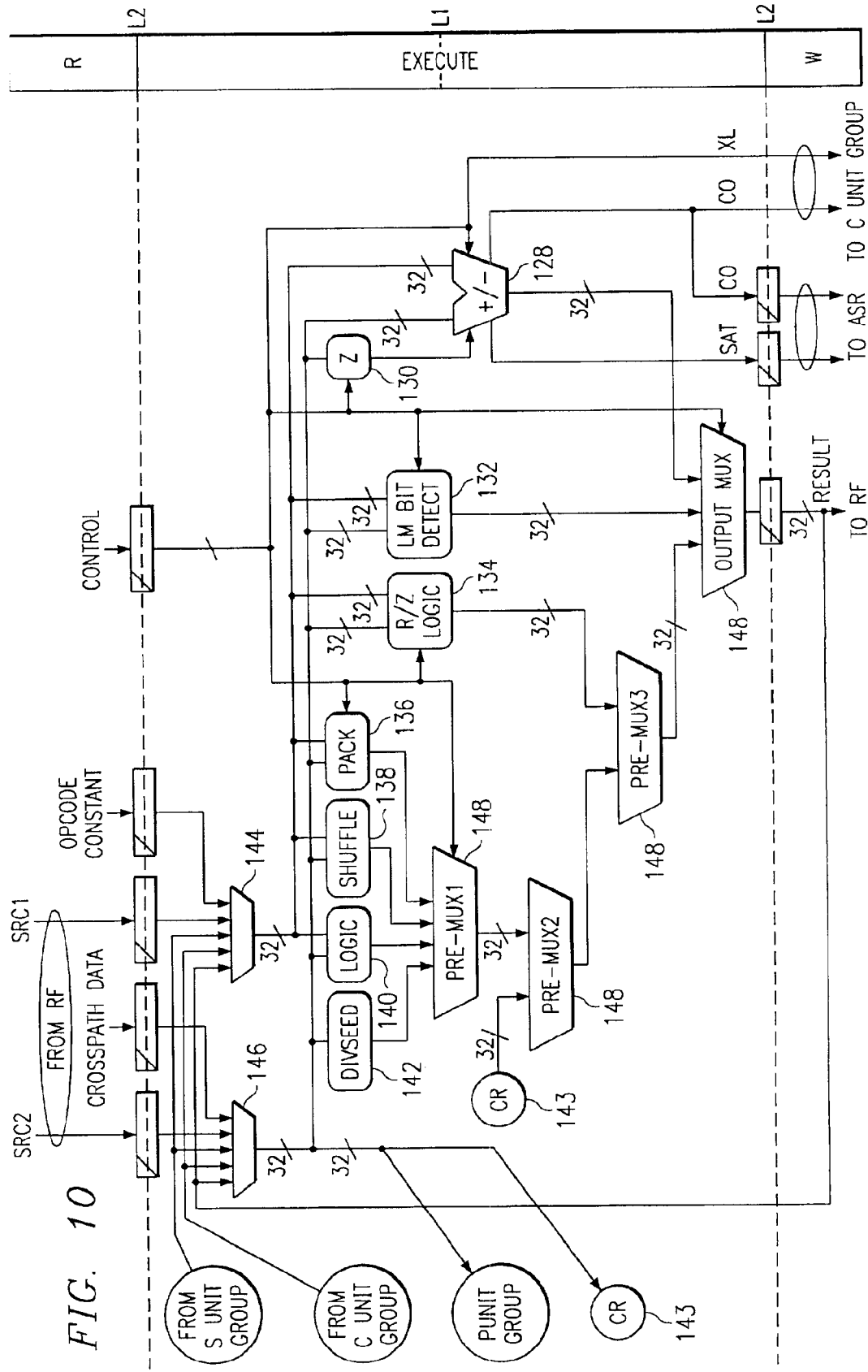
FIG. 10 is a block diagram of an A execution unit group of the DSP core of FIG. 2.

FIG. 10 is a top level block diagram of A unit group 78, which supports a portion of the arithmetic and logic operations of DSP core 44. A unit group 78 handles a variety of operation types requiring a number of functional units including: A adder unit 128, A zero detect unit 130, A bit detection unit 132, A R/Z logic unit 134, A pack/replicate unit 136, A shuffle unit 138, A generic logic block unit 140, and A div-seed unit 142. Partitioning of the functional sub-units is based on the functional requirements of A unit group 78, emphasizing maximum performance while still achieving low power goals. There are two input muxes 144 and 146 for the input operands, both of which allow routing of operands from one of five sources. Both muxes have three hotpath sources from the A, C and S result busses, and a direct input from register file 76 in the primary datapath. In addition, src1 mux 144 can pass constant data from decode unit 62, while src2 mux 146 provides a path for operands from the opposite datapath. Result mux 148 is split into four levels. Simple operations which complete early in the clock cycle are pre-muxed in order to reduce loading on the critical final output mux. A unit group 78 is also responsible for handling control register operations 143. Although no hardware is required, these operations borrow the read and write ports of A unit group 78 for routing data. The src2 read port is used to route data from register file 76 to valid configuration registers. Similarly, the write port is borrowed to route configuration register data to register file 76.

Figure 11:
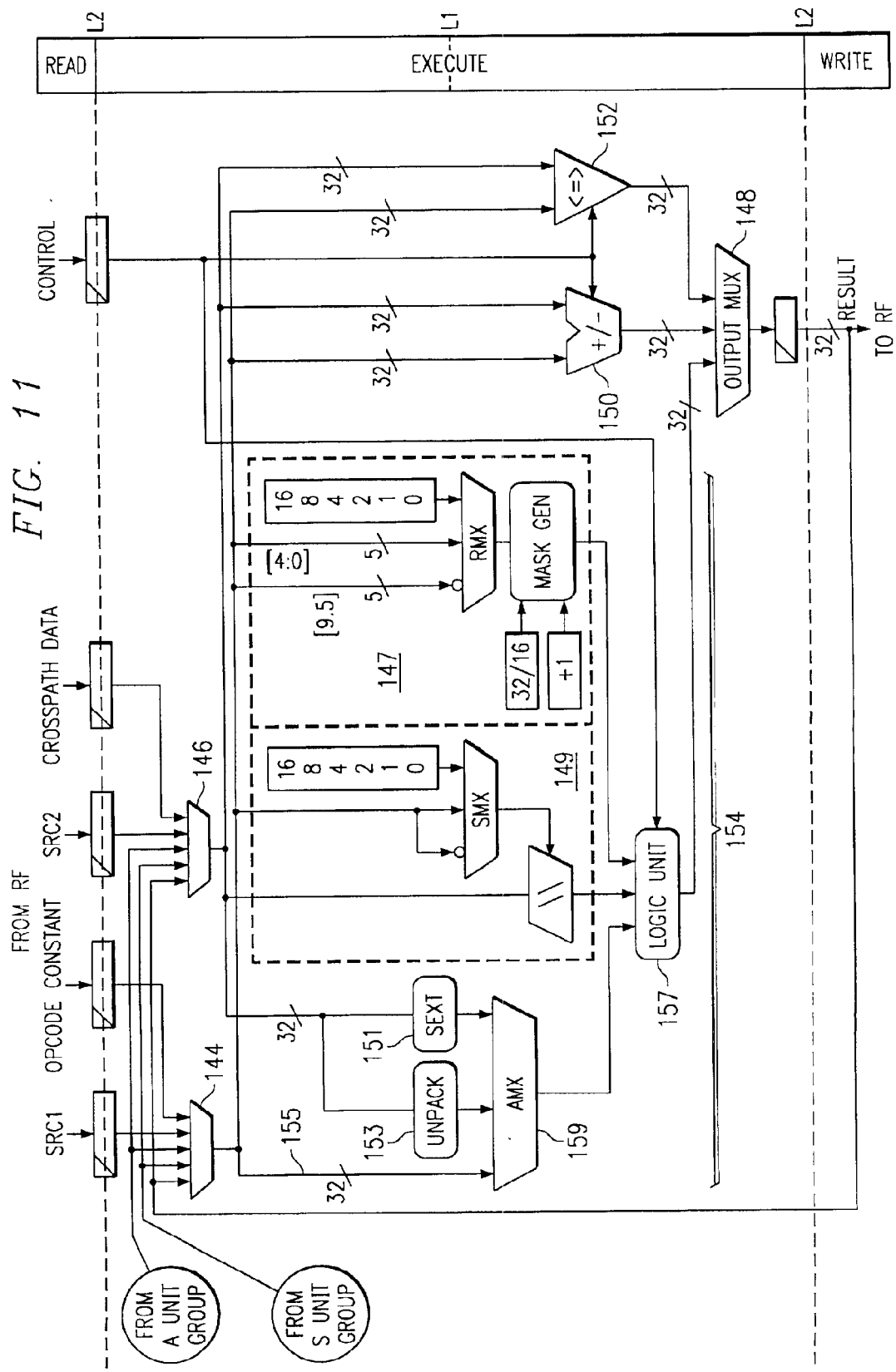
FIG. 11 is a block diagram of a C execution unit group of the DSP core of FIG. 2.

FIG. 11 is a top level block diagram of C unit group 80, which executes a subset of the arithmetic and logical operations of DSP core 44. Src1 input mux 144 and src2 input mux 146 perform the same functions as the input muxes in A unit group 78. C unit group 80 has three major functional units: C adder unit 150, C comparator unit 152 and C rotate/Boolean unit 154. C rotate/Boolean functional unit 154 includes C mask generator unit 147, C shifter unit 149, C sign-extension unit 151, C unpack unit 153, C move unit 155 and C logical unit 157. Like A unit group 78, the functional units of S unit group 80 are efficiently partitioned to achieve maximum performance while minimizing the power and area requirements. C Amx mux 159 selects an output from sign-extension unit 151, C unpack unit 153 or C move unit 155 for forwarding to C logical unit 157. Outputs from C mask generator unit 147 and C shifter unit 149 are also forwarded to C logical unit 157. Finally, result mux 148 selects an output from one of the three major functional units, C adder unit 150, C comparator unit 152 and C rotate/Boolean unit 154, for forwarding to register file 76.

Figure 12:
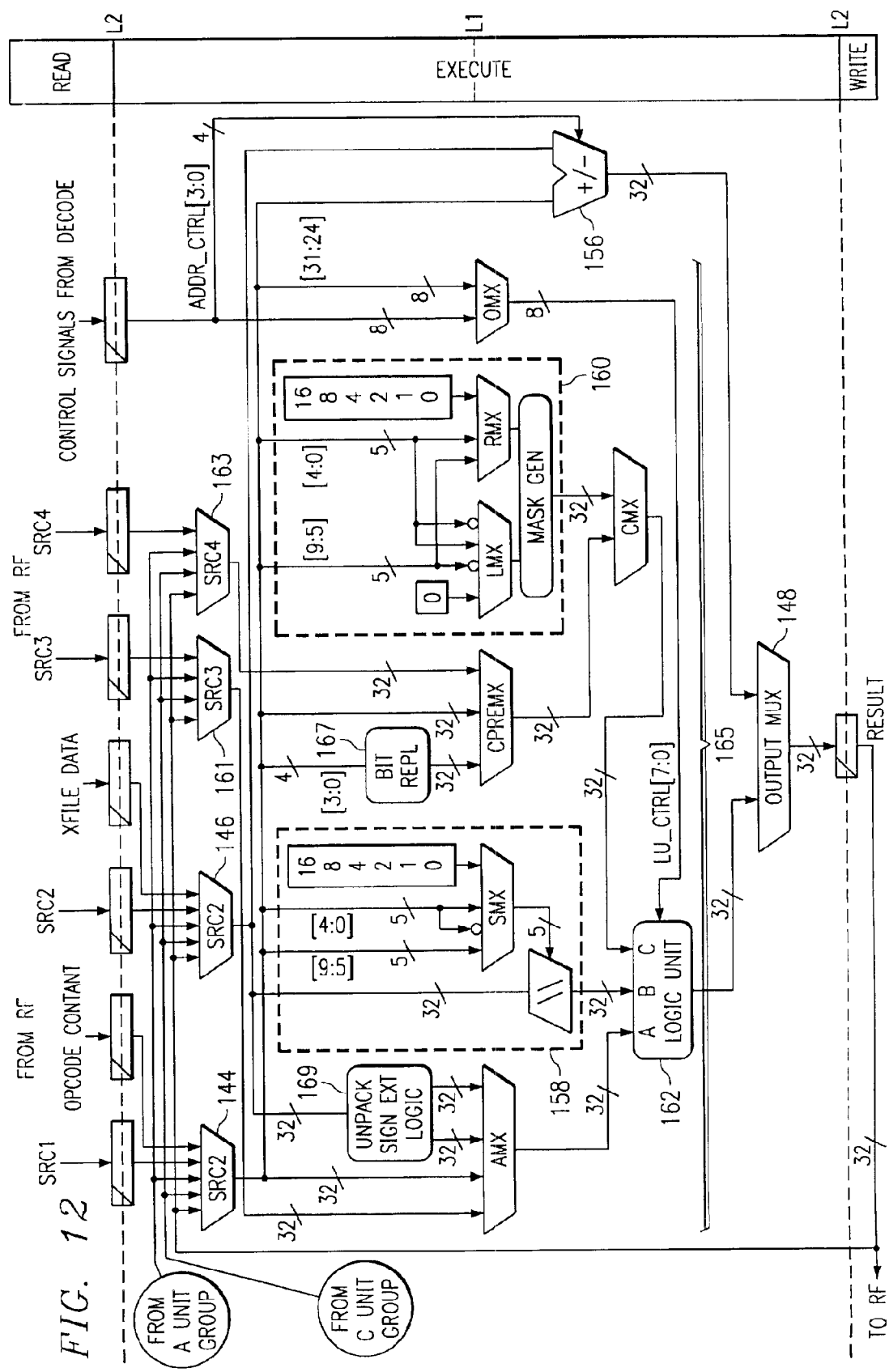
FIG. 12 is a block diagram of a S execution unit group of the DSP core of FIG. 2.
Figure 13:
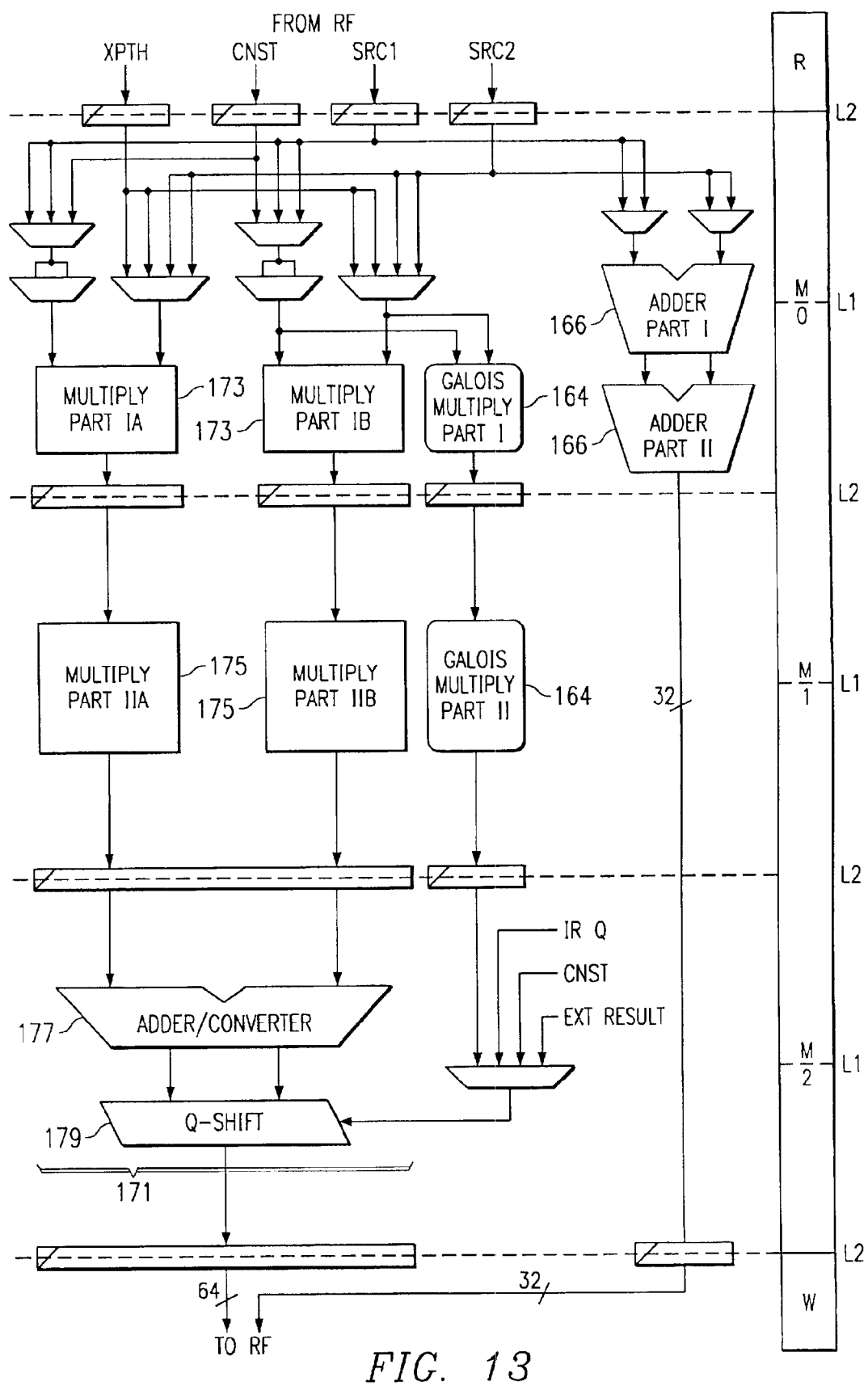
FIG. 13 is a block diagram of an M execution unit group of the DSP core of FIG. 2.

FIG. 12 is a top level block diagram of S unit group 82, which is optimized to handle shifting, rotating, and Boolean operations, although hardware is available for a limited set of add and subtract operations. S unit group 82 is unique in that most of the hardware can be directly controlled by the programmer. S unit group 82 has two more read ports than the A and C unit groups, thus permitting instructions to operate on up to tour source registers, selected through input muxes 144, 146, 161, and 163. Similar to the A and C unit groups, the primary execution functionality is performed in the Execute cycle of the design. S unit group 82 has two major functional units: 32-bit S adder unit 156, and S rotate/Boolean unit 165. S rotate/Boolean unit 165 includes S rotator unit 158, S mask generator unit 160, S bit replicate unit 167, S unpack/sign extend unit 169, and S logical unit 162. The outputs from S rotator unit 158, S mask generator unit 160, S bit replicate unit 167, and S unpack/sign extend unit 169 are forwarded to S logical unit 162. The various functional units that make up S rotate/Boolean unit 165 can be utilized in combination to make S unit group 82 capable of handling very complex Boolean operations. Finally, result mux 148 selects an output from one of the two major functional units, S adder unit 156 and S rotate/Boolean unit 165, for forwarding to register file FIG. 13 is a top level block diagram of M unit group 84, which is optimized to handle multiplication, although hardware is available for a limited set of add and subtract operations. M unit group 84 has three major functional units: M Galois multiply unit 164, M adder unit 166 and M multiply unit 171. While M adder unit 166 can complete its operations within the Execute cycle, the other two units require two additional cycles to complete the multiply operations. In general, M multiply unit 171 can perform the following operations: two 16×16 multiplies or four 8×8 multiplies with all combination of signed or unsigned numbers, Q-shifting and A-shifting of multiply results, rounding for extended multiply (EMPY) instructions, controlling the carry chain by breaking/joining the carry chain at 16-bit block boundaries, and saturation multiplication where the final result is shifted left by 1 or returns 0x7FFFFFFF if an overflow occurs. Multiplication is broken down into three stages, starting with Multiply Parts IA & IB 173, which provide the inputs for Multiply Parts IIA & B 175, followed by the final stage which contains Adder/Converter 177 and Q-shift 179. M Galois multiply unit 164 performs Galois multiply in parallel with M multiply unit 171. For output from M unit group 84, the Galois multiply result is muxed with the M multiply result. M adder unit 166 is only lightly coupled to the other units in M unit group 84: it shares read port, but has a dedicated write port, making it possible for both a multiply and an add instruction to write results in the same cycle from M unit group 84.

Figure 14:
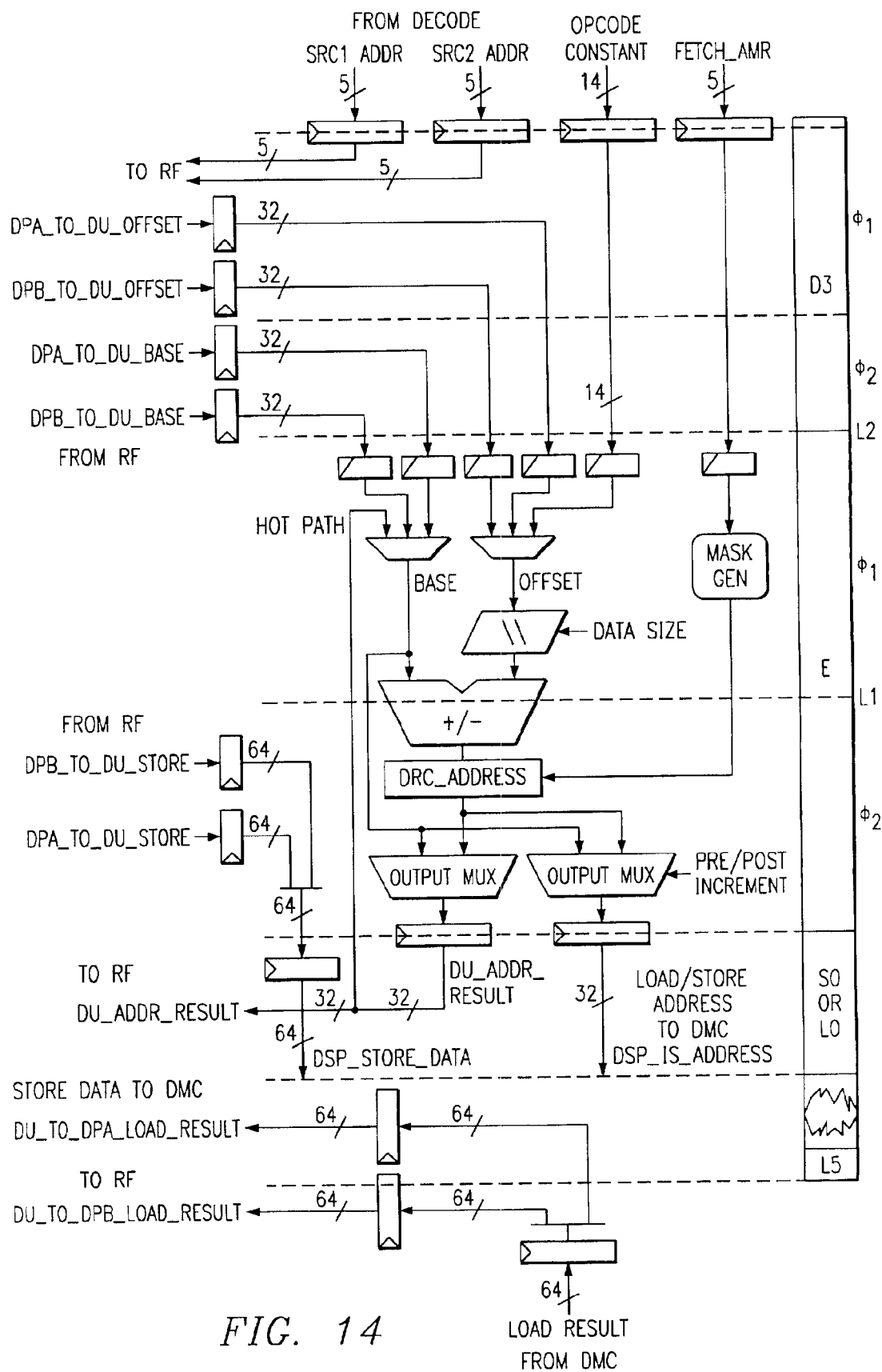
FIG. 14 is a block diagram of the D execution unit group of the DSP core of FIG. 2.

FIG. 14 is a top level block diagram of D group unit 72, which executes the load/store instructions and performs address calculations. D unit group 72 is shared between the two datapaths A 68 and B 70, and can reference the register files 76 of both datapaths. D unit group 72 also interfaces with Data Memory Controller 48. Load and Store instructions operate on data sizes from 8 bits to 64 bits. The different addressing modes supported by D unit group 72 are basic addressing, offset addressing, indexed addressing, auto-increment/auto-decrement, long immediate addressing, and circular addressing. In basic addressing mode, the content of a register is used as a memory address. In offset addressing mode, the memory address is determined by two values, a base value and an offset that is either added or subtracted from the base. The base value always comes from an address register, whereas the offset value may come from either an address register or a 5-bit unsigned constant contained in the instruction. Index addressing mode functions the same as offset addressing mode, except that the offset is interpreted as an index into a table of bytes, half-words, words or double-words, as indicated by the data size of the load or store operation. In auto-increment/decrement addressing mode, the base register is incremented/decremented after the execution of the load/store instruction. There are two sub-modes, pre-increment/decrement, where the new value in the base register is used as the load/store address, and post-increment/decrement where the original value in the register is used as the load/store address. In long-immediate addressing mode, a 14-bit unsigned constant is added to a base register to determine the memory address. In circular addressing mode, the base register along with a block size define a region in memory. To access a memory location in that region, an new index value is generated from the original index modulo the block size.

The address calculation for load/store operations is performed during the Execute stage of the pipeline, and the address write-back occurs in the phase1 of the next clock cycle. The newly calculated address value is also forwarded using a hot path, back to phase1 of E stage, which allows zero delay slot execution for back to back address calculations. The load/store address is calculated and passed onto DMC 48 after pipeline stage E. Results of a load are available from DMC 48 after 6 cycles in pipeline stage L5. The load operation has six delay slots. Data for store is supplied to DMC 48 in pipeline stage S0 along with the calculated address for the store location. FIG. 14 illustrates the different interconnections to register file 76 for fetching the operands from the two datapaths A 68 and B 70, getting the data for the store, and sending the results of address calculations and load operations to both datapaths. FIG. 14 approximately shows the relative pipeline stages during which the address results are computed and load/store data is received and sent, respectively.

FIG. 15 is a chart of the basic assembly format for DSP core 44 instructions, along with examples for each functional unit group. The '||' notation is used in optimized/scheduled assembly to indicate that an instruction is scheduled in the same execute packet with the preceding instruction(s). For example, in the following sequence, instructions (1) through (6) are scheduled in the same execute packet, and should execute simultaneously, although all six instructions will not complete at the same time.

|     | ADD | .A1 | A1, A2, A3 | ; (1) |
| --- | --- | --- | --- | --- |
| \|\| | SUB | .C1 | A4, A5, A6 | ; (2) |
| \|\| | SHL | .S1 | A7, A8, A9 | ; (3) |
| \|\| | MPY | .M1 | A10, A11, A12 | ; (4) |
| \|\| | ADD | .A2 | B1, B2, B3 | ; (5) |
| \|\| | MPY | .M2 | B4, B5, B6 | ; (6) Instructions (1), (2), |
|     |     |     |     | ; (3), ; (4), (5), (6) may be |
|     |     |     |     | ; scheduled in the same execute |
|     |     |     |     | ; packet |
|     | SUB | .A2 | B3, B2, B1 | ; (7) Instruction (7) must be |
|     |     |     |     | ; scheduled in the next execute |
|     |     |     |     | ; packet because it reuses unit |
|     |     |     |     | ; group A2 |

All instructions can be predicated (conditionally executed) on the value of a predication register. Assembly examples using the [predication reg] notation follow:

| [A0] | ADD .A1 A1, A2, A3 | ; execute the ADD instruction |
| --- | --- | --- |
|     |     | ; if A0 is non-zero |
| [!A0] | ADD .C2 B7, B8, B9 | ; execute the ADD instruction |
|     |     | ; if A0 is zero |

Because several instructions such as ADD or SUB are available in more than one unit group, the '.unit' notation is recommended when the programmer specifically wants to direct an instruction to a particular unit group. If the '.unit' notation is omitted, the compiler or assembler will automatically assign instructions to appropriate unit groups.

Load, store and address instructions are only available in D-unit group 72, therefore the .D specification is redundant and optional. For the same reason, the .P specification is redundant for branch instructions in P-unit group 74.

The 'datapath' notation is also redundant and optional because the destination register implicitly specifies the datapath (note that for store instructions, the source register specifies the datapath). The 'crosspath' notation is used to indicate that one of the source operands (generally, op1 for the shift and bit-field instructions, op2 for all others; unary instructions may also use the crosspath on their operand) comes from the other datapath's register file via the crosspath.

Generally, one important aspect of designing a microprocessor architecture is selecting the length of a cycle in the instruction pipeline. The cycle time determines how much can be accomplished in any given cycle, and whether some functions require multiple cycles because they cannot complete in one cycle. With a pipelined architecture where there is overlap in execution from one instruction to the next, it is advantageous to select a functional task that can be run continuously and use that task to determine the desired cycle time. As used herein, the phrase "Golden Unit" means the internal microprocessor function that sets the timing required for the instruction cycle by setting the duration of the pipeline stage. As used herein, the phrase "Golden Cycle" means the resulting cycle time associated with the execution of one Golden Unit cycle. Generally, the most used function in the microprocessor should be selected as the Golden Unit, which can then run back-to-back cycles in the instruction pipeline. Thus the most used circuitry is kept running as much as possible during normal processing.

Figure 16A:
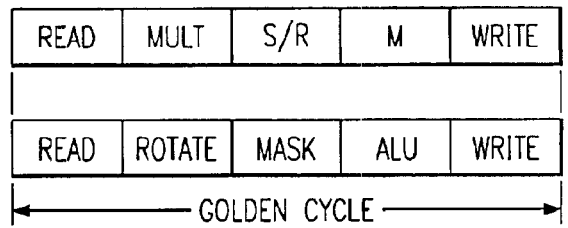
FIGS. 16a and 16b are temporal block diagrams of prior art pipeline stages.
Figure 16B:
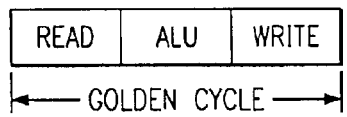

Referring now to FIG. 16a, there is shown a prior art selection of a Golden Cycle. In this design, which is used in the TEXAS INSTRUMENTS™ TMS320C80™, for example, the register read/multiply/scale/round/mux/register write sequence is the Golden Unit, and the cycle timing is selected to fit that sequence. A microprocessor implementing this Golden Unit could run single cycle multiplies continuously, relative to the pipeline stage length set by this selection. The adder takes much less time, and could thus include rotate or bit detect or mask selection in the same cycle as shown in FIG. 16a. As another example, the TEXAS INSTRUMENTS™ TMS320C60™ has the register read/ALU/register write shown in FIG. 16b selected as the Golden Unit. A microprocessor implementing this Golden Unit can continuously run these processes at peak rate.

Figure 16C:
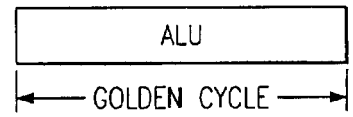
FIG. 16c is a temporal block diagram of a pipeline stage of the present invention.

According to the present invention, the adder functional unit (plus minimal overhead) of the various functional unit groups (e.g., A, C & S) is selected to be the Golden Unit, as shown in FIG. 16c. Some functions (e.g., shift, Boolean) may be faster and complete their processes in a shorter time, while some functions (e.g., multiply) may be slower and need to use multiple cycles. Because the ALU is the most used function, it should be kept running at maximum capacity for the highest processor throughput. The present invention allows the ALU to operate 100% of the time through this cycle selection and the use of instruction pipelining. Generally, this selection sets the clock frequency of the microprocessor, and dictates how much may be done in a single clock cycle anywhere on the chip. According to a circuit feasibility study on the Golden Cycle critical path, the adder, implemented in six levels of dynamic logic, can perform all required single-instruction, multiple data (SIMD) add/subtract instructions except for extended precision operations. With this adder implementation, the Golden Cycle consists of eight levels of dynamic logic per clock cycle, or four levels per clock phase. Therefore, on the parts of the chip (especially the datapath) where dynamic logic and latch-based design are employed, each clock phase may not accommodate more than four levels of dynamic logic. On the parts of the chip where static (FF-based) logic are used, each clock cycle may not accommodate more than the static logic equivalent of eight levels of dynamic logic. In terms of delay, one level of dynamic logic is approximately equivalent to two static NAND2 gates of fanout three, which means that each clock cycle may accommodate no more than about sixteen levels of static NAND2 gates.

Instruction execution takes a various number of CPU cycles to flow through the DSP pipeline, where a CPU cycle is defined as the period of time an execute packet spends in a pipeline stage. In normal operation, a CPU cycle is equivalent to a clock cycle. In the case of hardware stalls (e.g., due to off-chip memory access), a CPU cycle may span several clock cycles. In the optimal condition, (1) an instruction is completed every CPU cycle, and (2) its result can be used as an operand by the ensuing instruction on the next CPU cycle. An instruction executed in the optimal condition is referred to as having zero-delay slot, where a delay slot is defined as the number of extra CPU cycle(s) beyond the above optimal condition. Most instructions satisfy the first criterion of the optimal condition, but some do not. For example, multiplication, load and store instructions require more complex operation and therefore take several CPU cycles. The second criterion is dependent on hardware implementation of result and operand routing among execution unit groups and/or across adjacent data paths. For a result to be immediately usable on the next CPU cycle, it must be bypass the register file and be hotpathed to the operand input of the next instruction.

Figure 17:
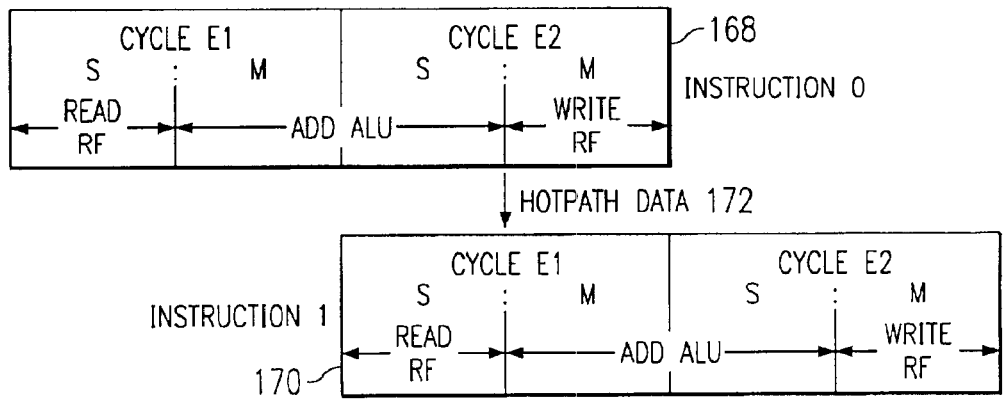
FIG. 17 is a timing diagram of the relative timing of two sequential add instructions utilizing register file bypass via a hotpath.

Referring to FIG. 17, the Golden Cycle of the present invention is achieved by pipelining the register file reads, 32-bit add/subtract and register file write over a two cycle period. The register file reads occur in the first half of the first cycle. Then the 32-bit add, along with input and output muxing, occur in the second half of the first cycle and the first half of the second cycle. Finally, the register file write occurs in the second half of the second cycle. As can be seen in FIG. 17, the sum of the register read time and the register write time is about the same as the ALU time. This should be valid for a register file in the range of 32 registers, and allows the adder/ALU to be operated continuously from instruction to instruction. Note that the RF write for the output of Instruction 0 168 occurs after the RF read for Instruction 1 170, and during first half of the add operation of Instruction 1 170. This scheme does not present a problem if the output result of Instruction 0 168 is not required for the operand inputs to Instruction 1 168. If the destination register for Instruction 0 168 is the same as one of the source registers for Instruction 1 170, however, then the data read by Instruction 1 will not be correct, because Instruction 0 has not completed writing to the register yet. One solution to this problem is to cause Instruction 1 to delay with a delay slot (e.g., No Operation (NOP) instruction) in order to give Instruction 0 time to finish writing to the register. This solution, however, slows down the processor throughput, especially because one instruction frequently uses the output of the previous instruction in normal programming code.

Figure 18:
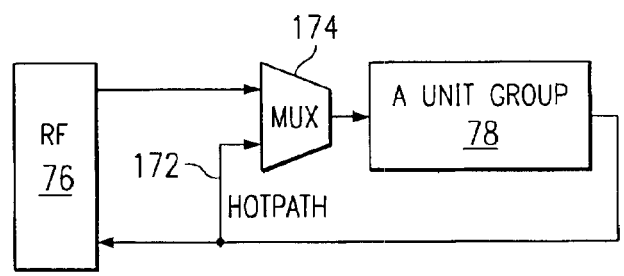
FIG. 18 is a block diagram of a register file bypass comprising a hotpath.

Alternatively, according to the present invention, a register file bypass or hotpath 172 is used to avoid having a delay slot. This allows two consecutive instructions to execute in back-to-back cycles without a pipeline stall, even when the current instruction uses the result of the prior instruction as an operand. FIG. 18 is a block diagram of register file bypass 172 for functional unit group 78 that feeds the output of unit group 78 back to its own input through input mux 174, while also storing the result in a destination register in register file 76 as usual. Input mux 174 selects between the data recalled from the operand register of register file 76 or the output of ALU 78 destined for register file 76. Mux 174 is controlled by detection of whether the input operand register number equals the destination register number. If they are unequal, then the output data is destined for another register and the recalled register data is correct, so mux 174 selects the data recalled from register file 76. If they are equal, then the output data is destined to be stored in the input operand register. The register read occurs normally and the register write occurs normally, however, mux 174 selects the output of ALU 78. The output data thus bypasses the requirement of storage in register file 76 before being available for use as an operand. Source and destination register numbers are known by the middle of decode stage D3, so the comparisons can be made during execute stage E.

In a preferred embodiment, there are several functional unit groups which can read from and write to register file 76. It is advantageous to provide hotpaths not only from one functional unit group output to its own input, but also to the other functional unit groups' inputs, because they too may require that output result as an operand in the next instruction. Practically, however, to provide hotpaths for all such combinations would require a very large number of comparisons and a very wide fan-in for the operand muxes. While this could be done, practically it would require too much hardware and too much time for processing. With a total of about twenty functional units within the functional unit groups in a given datapath, full hotpath implementation would require about forty comparators (twenty destinations compared with forty input operands), and forty 21-input muxes. Therefore the number of possible hotpaths is reduced by providing hotpaths only between the critical operation sequences.

Figure 19:
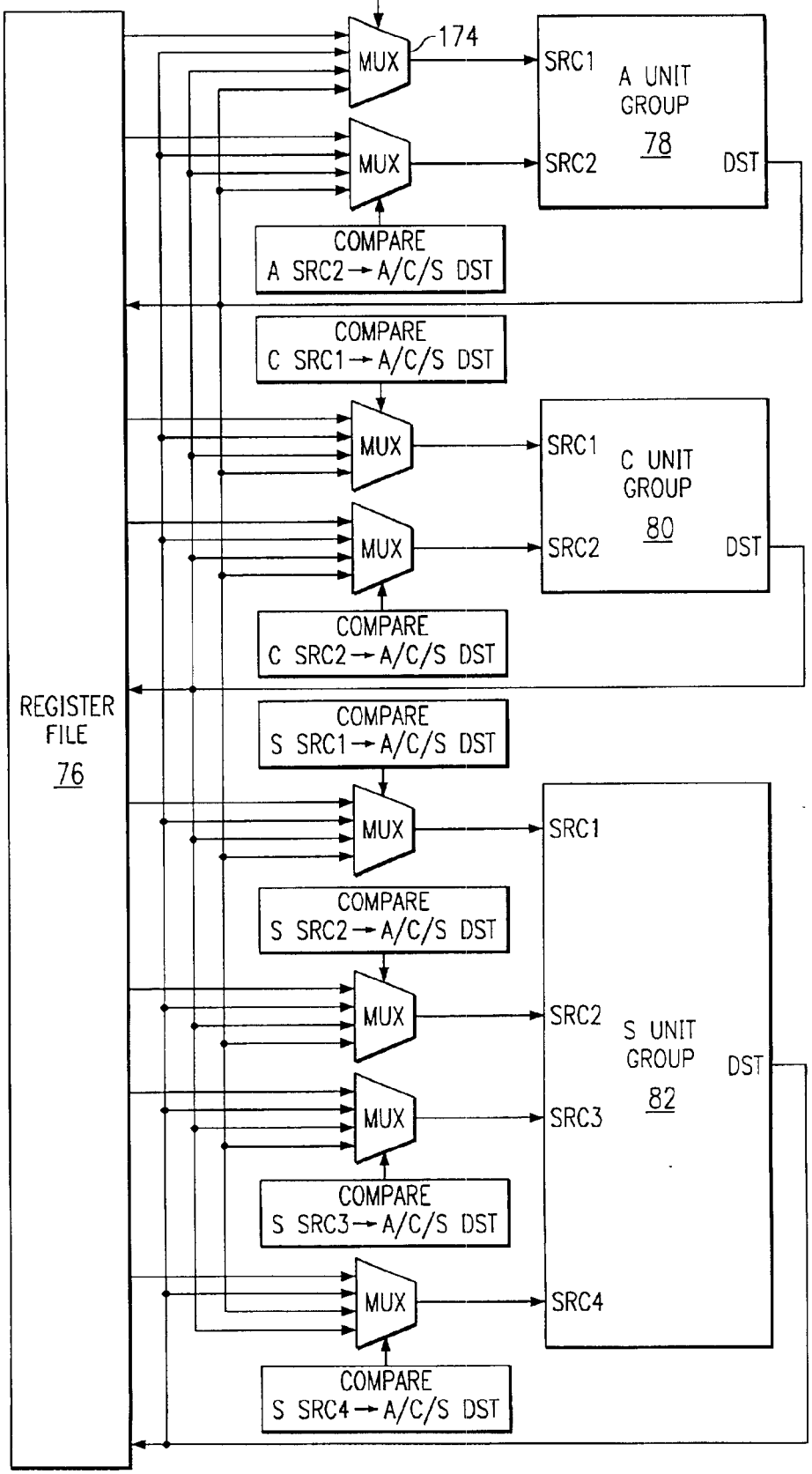
FIG. 19 is a top level block diagram of hotpaths between various functional unit groups.

First, within each datapath, A 68 and B 70, shown in FIG. 2, the functional units are grouped into several functional unit groups, A 78, C 80, S 82 and M 84, with D 72 and P 74 shared between two datapaths. Instruction coding generally does not permit use of every functional unit every instruction cycle. Therefore the functional units are clustered into groups such that functions which are often executed simultaneously within the same instruction cycle are placed in different functional unit groups. Within each group are functional units which are not often used together. A selected functional unit within each unit group is enabled for an instruction cycle, and the other functional units are disabled for that instruction. As shown in FIG. 19, in accordance with a preferred embodiment, the A 78, C 80, and S 82 functional unit groups' output results are hotpathed back to their own input operands, and also to each other's input operands. Comparator 181 compares the operand register number with the various destination register numbers and signals register bypass multiplexer 174 to select data from the respective hotpath if there is a match, or from register file 76 if there is no match. Within a datapath, unit group to unit group data transfer other than between the A, C, and S unit groups must be done via register file 76. As shown in FIG. 12, S unit group 82 actually has four input ports, and there are two additional input muxes to allow hotpaths for each of the four input operands. There is no hotpath to or from the M functional unit group 84, because of its long latency. The address hardware's output in D unit group 72 is internally hotpathed to the base address input of D unit group 72, which enables back-to-back loads or stores using the same base register when using auto-increment addressing modes. The index input of the D unit group's address hardware and the input/output buses of D unit group's load/store hardware are not hotpathed. This reduced hotpath implementation only requires about eighteen comparators, eight 4-input muxes (A, C & S) and one 2-input mux (D), which is significantly less than the full implementation. Practically, these numbers are increased slightly to allow for input muxing of a constant or cross-file data (i.e., data from the opposite datapath). The comparators implement part of the predication function as well. The following examples illustrate how instructions processing the same data can be executed back-to-back because of the hotpath bypassing the register file:

| ADD | .A1 | A0,A1,A3 | ;Hotpath exists from A unit group ;to C unit group, |
|---|---|---|---|
| SUB | .C1 | A3,A8,A9 | ;A3 bypasses RF, SUB can be ;executed on next cycle |
| STW | .D | A2,*++A1 | ;A1 used as base register and is ;auto-incremented, |
| STW | .D | A3,*A1 | ;New contents of A1 are hotpathed ;within D unit group Next STW ;instruction can be executed on ;next cycle, |
| ADD | .A1 | A0,A1,A3 | ;No hotpath exists from A unit ;group to M unit group, |
| NOP | | | ;A3 cannot be forwarded and ;requires 1 delay slot, |
| MPY | .M1 | A3,A4,A5 | ;MPY can now use A3 |

Figures 20, 21:
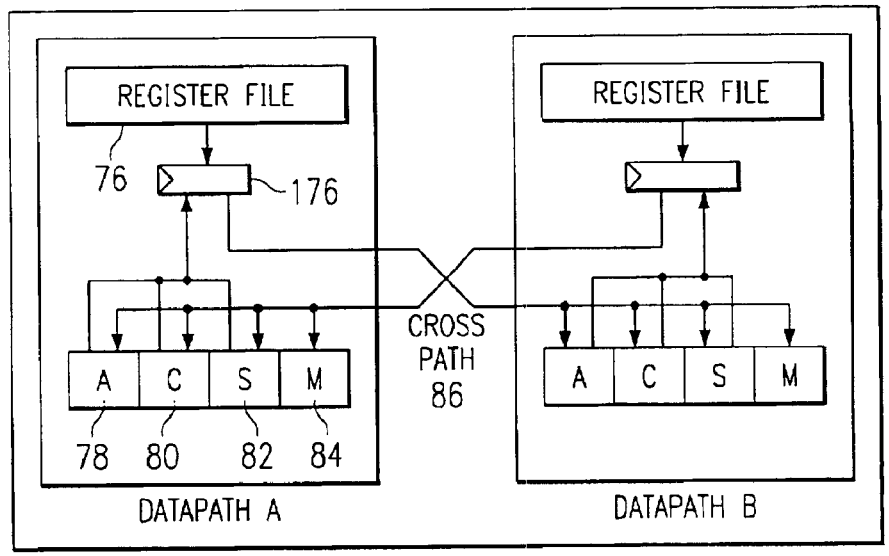
FIG. 20 is a top level block diagram of the crosspath between datapaths A & B of the DSP core of FIG. 2.
FIG. 21 is a chart of delay slot requirements for all arcs between execute unit groups of FIG. 2.

As previously described with respect to FIG. 2, each datapath has direct read access to its own register file. Data in the opposite register file may be read, via crosspath 86, also shown in FIG. 2, and in more detail in FIG. 20. There is one crosspath port available to each datapath and it is used for read only; writing a result from one datapath to a register destination in the opposite datapath is not allowed. Because all execution units within each datapath share the crosspath port, there can be at most 1 cross-file read per datapath per cycle, however the cross-file operand may be shared among the four execution unit groups within a datapath. In addition to a crosspath comparator and multiplexer, the crosspath port includes crosspath register 176 between the two datapaths, and thus introduces an extra delay slot over register reads kept within one datapath. Thus, the single cycle cross-file read penalty varies from 1 to 2 delay slots, depending on where the data operand comes from. The result buses of the A, C, & S unit groups are hotpathed to the crosspath port. Therefore, there is a one delay-slot penalty if the data operand used by the ensuing instruction comes from the A, C, & S unit groups (e.g., an add result from the A unit group), and there is a two delay-slot penalty for other single cycle operations (e.g., an add result from the M unit group). Referring now to FIG. 21, there is shown a summary of the delay slots required for the transfer of data between the various functional unit groups, both within the same datapath and between datapaths. The following examples illustrate how the use of the crosspath port and the associated hotpath bypassing the register file:

| ADD | .A1 A0,A1,A3 | ;A3 data is hotpathed into the ;crosspath port |
|---|---|---|

-continued

| | | |
|---|---|---|
| NOP | | ;1 delay-slot for the crosspath ;port register |
| SUB | .A2X B8,A3,B9 | ;SUB can use A3 (X=an operand is ;from other RF) |
| ADDA | .D A0,A1,A3 | ;Data is not forwarded into the ;crosspath port |
| NOP | | ;Wait for A3 to be written back to ;the register file |
| NOP | | ;A3 is read into the crosspath port |
| SUB | .A2X B8,A3, | ;SUB now can use A3 |
| ADD | .A1X A0,B1,A1 | ; ** Sequence Not Allowed ** |
| ‖ SUB | .C1X A2,B2,A3 | ;2 units in datapath A attempt to ;access different cross-file ;operands, B1 & B2, at the same ;time. |
| ADD | .A1X A0,B1,A1 | ; ** Sequence Allowed ** |
| ‖ SUB | .C1X A2,B1,A3 | ;Because all 4 units in datapath A ;read |
| ‖ SHL | .S1X A4,B1,A5 | ;the same cross-file operand B1. |
| ‖ MPY | .M1X A6,B1,A7 | ;— |
| ‖ ADD | .A1X A10,B1,A11 | ; ** Sequence Allowed ** |
| ‖ ADD | .A2X B10,A1,B11 | ;2 instructions, each executed ;in separate datapath and both ;accessing cross-file ;operands, may be scheduled in ;the same execute packet. |

Figure 22A:
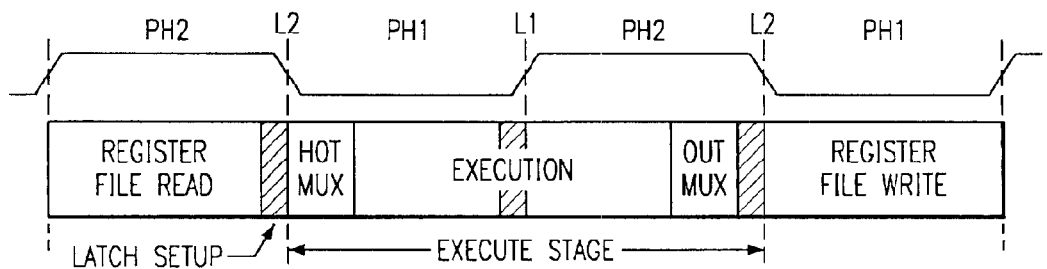
FIG. 22a is a timing diagram illustrating pipeline timing relative to clock phases.
Figure 22B:
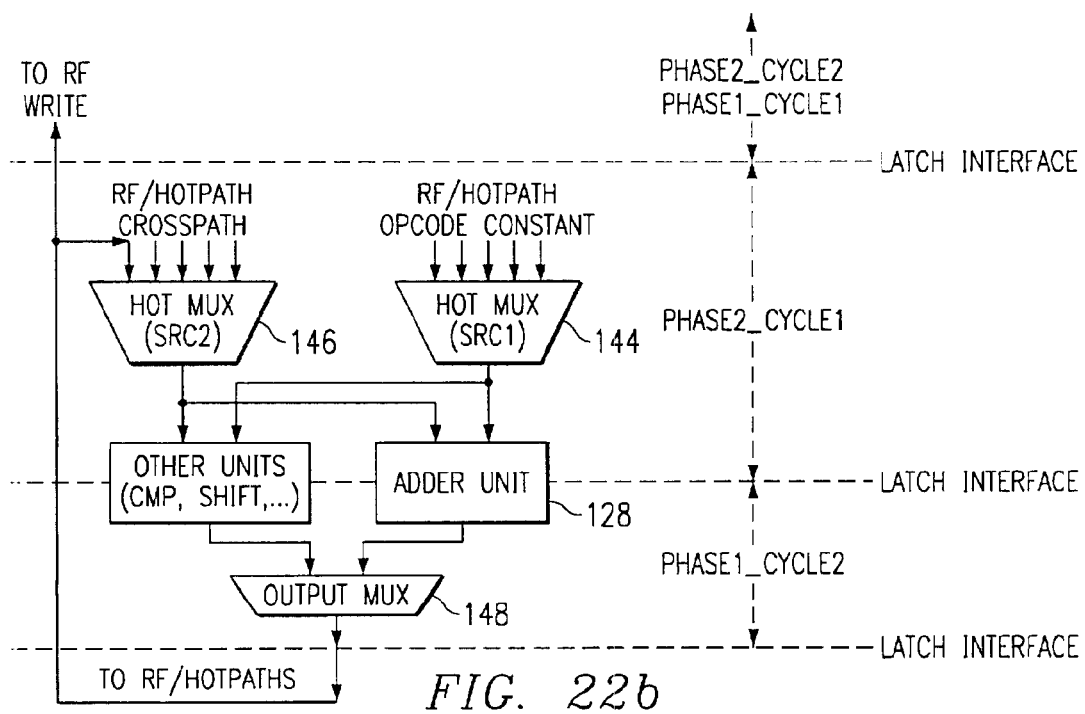
FIG. 22b is a temporal block diagram of the functions occurring within an execute stage within the pipeline.

Referring now to FIGS. 22a and 22b, there is shown a timing diagram and a temporal block diagram, respectively, of the functions associated with execute stage within the pipeline. As discussed earlier, the Golden Cycle includes not only the 32-bit add/subtract, but also the hotpath (RF bypass) input operand mux, 144 and 146, and the output result select mux 148. The hotpath enters the pipeline after the latching of the register file read data. Input muxes 144 and 146 select the appropriate inputs based on control signals from the decode unit. The execute stage includes a pipeline latch in the middle of the stage for emulation capture and such. The logic state is latched into the register but the actual logic path does not go through the latch. The output result mux 148 selects the output from the enabled functional unit within a functional unit group. The output result is then latched for the register file write cycle.

Figure 23A:
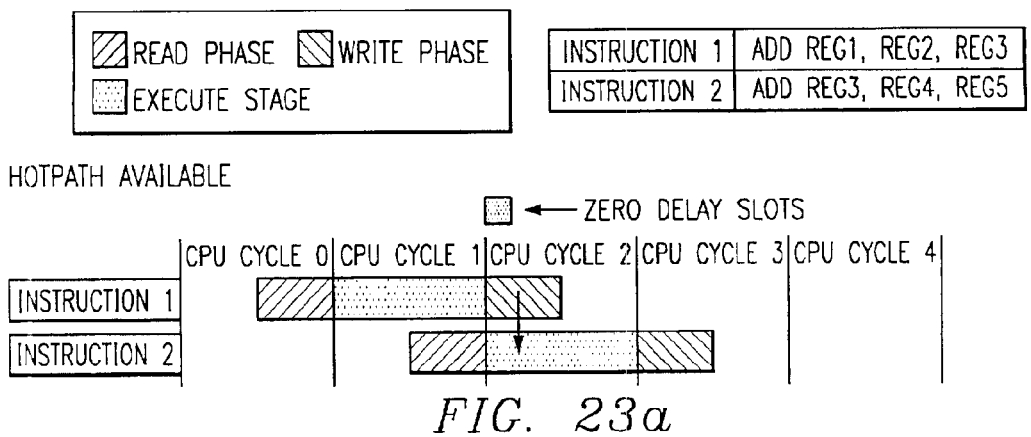
FIGS. 23a, 23b, 23c and 23d are timing diagrams of the relative timing between instructions both with and without hotpath availability.
Figure 23B:
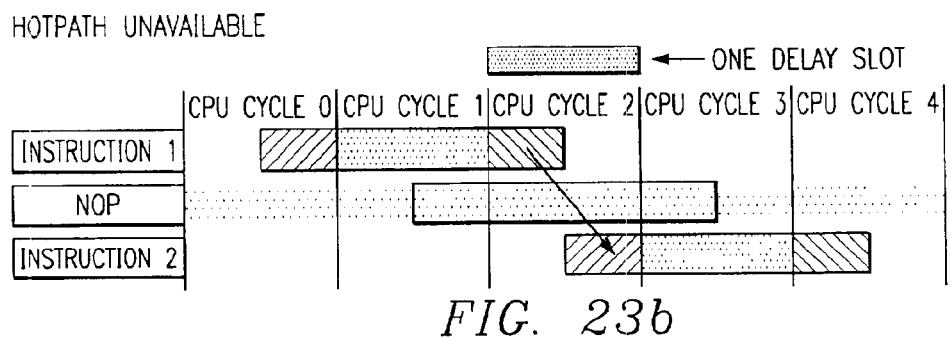

FIGS. 23a, 23b, 23c, and 23d are timing diagrams showing the relative timing between successive instructions both with and without hotpath availability. In each case, the number of delay slots is dependent on both the unit group/datapath generating a result and the unit group/datapath consuming the result. The first case in FIG. 23a demonstrates instruction execution when a hotpath is available between the functional unit group executing instruction 1 and the functional unit group executing instruction 2. This is the case, for example, for two instructions executed in the A, C, or S unit groups in the same datapath and accessing that datapath's register file. No delay slots are required, so instruction 2 can be scheduled in the next execute packet after the one containing instruction 1. The second case in FIG. 23b illustrates the scenario in which no hotpath is available and the operand of instruction 2 comes from the register file of the same datapath. This is the case, for example, for one instruction being an add in the M unit group and one instruction being an add in the A, C, S, or M unit groups. A single delay slot is required to allow the result of instruction 1 to be written to the register file so that instruction 2 can read the new value from the register file.

Figure 23C:
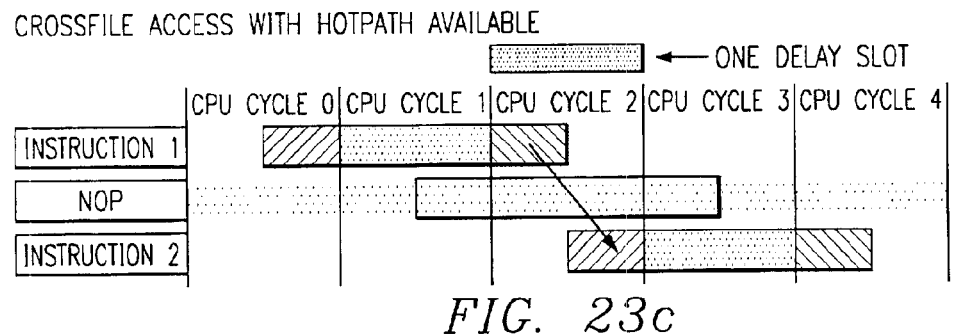
Figure 23D:
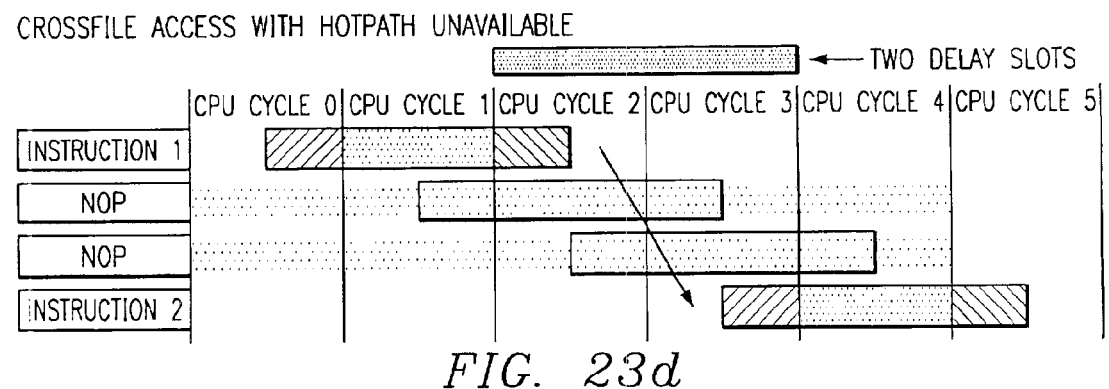

The third case in FIG. 23c demonstrates instruction execution where a crosspath register file access is made for data from a unit group with a hotpath to the crosspath register. This is the case, for example, for instruction 1 being executed in the A, C, or S unit groups in one datapath and instruction 2 being executed in the A, C, S or M unit groups in the opposite data path. Even though there is a hotpath, this case still requires an execute packet between the execute packet containing instruction 1 and that containing instruction 2. The single delay slot is required because the data is latched in the crosspath register 176. Finally, the fourth case in FIG. 23d illustrates the scenario where a crosspath register file access is made for data from a unit group with no hotpath to the crosspath register. This is the case, for example, for instruction 1 being executed in the M unit group in one datapath and instruction 2 being executed in the A, C, S or M unit groups in the opposite data path. In this case two CPU cycles are required for the result to be available to the other datapath, first for the result to be stored in register file, and then for the data to be latched into the crosspath register 176.

Figure 24:
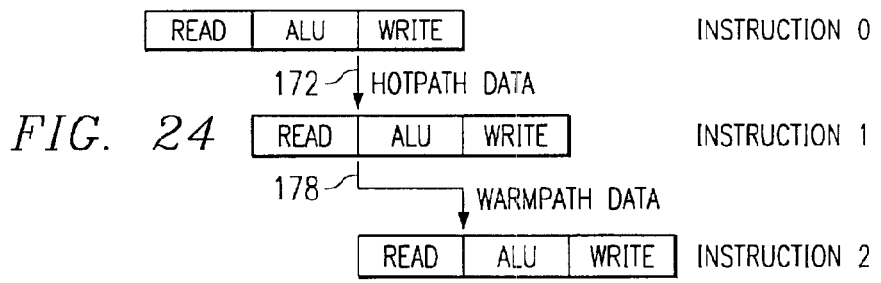
FIG. 24 is a timing diagram of the relative timing of three sequential arithmetic logic unit (ALU) instructions utilizing register file bypass via a hotpath and a warmpath.
Figure 25:
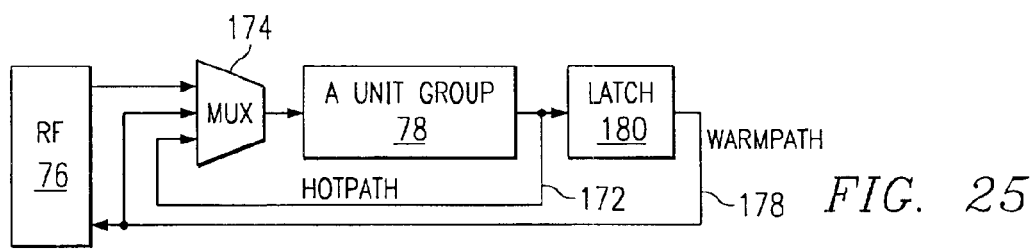
FIG. 25 is a block diagram of a register file bypass comprising a hotpath and a warmpath.

The present invention may be used for different pipeline schemes with different timing requirements. As shown in FIG. 24, for example, if the process node changes or the register file gets larger, the register read timing, register write timing and the ALU timing could take about the same amount of time, instead of the ALU taking twice as long as the register accesses. In this embodiment, illustrated in FIG. 25, the bypass technique includes both a hotpath 172 and a warmpath 178. In FIG. 25, hotpath 172 is used if an instruction uses an operand register written to by the prior instruction. The hotpath functions in the same way as described above with respect to FIG. 18, except that the hotpath uses the output result before it is latched in latch 180 instead of after. This pipeline scheme also requires warmpath 178, which is used if an instruction uses an operand register written to by the second preceding instruction. As shown in FIG. 24, the write pipeline stage of instruction 0 would not complete before the beginning of the read pipeline stage of instruction 2. Thus warmpath 178 is necessary to provide the correct data without requiring a delay slot for the second succeeding instruction. Warmpath 178 uses the output result after it is latched in latch 180 on the output of the unit group in order to hold the data until the ALU stage of instruction 2 needs the data. If a subsequent instruction, instruction 3, needs data from the destination register of instruction 0, then a coldpath is used, i.e., the data is both stored in and recalled from the register file.

Several example systems which can benefit from aspects of the present invention are described in U.S. Pat. 5,072,418, in particular with reference to FIGS. 2–18 of U.S. Pat. No. 5,072,418. A microprocessor incorporating an embodiment of the present invention to improve performance or reduce cost may be used to further improve the systems described in U.S. Pat. No. 5,072,418. Such systems include, but are not limited to, video imaging systems, industrial process control, automotive vehicle safety systems, motor controls, robotic control systems, satellite telecommunications systems, echo canceling systems, modems, speech recognition systems, vocoder-modem systems with encryption, and such.

As used herein, the terms "applied," "connected," "connecting," and connection" mean electrically connected, including where additional elements may be in the electrical connection path. As used herein, the term "microprocessor" is intended to encompass "microcomputers," which generally are microprocessors with on-chip Read Only Memory (ROM). As these terms are often used interchangeably in the art, it is understood that the use of one or the other of these terms herein should not be considered as restrictive as to the features of this invention.

Various specific circuit elements well known in the art may be used to implement the detailed circuitry of the preferred embodiments, and all such alternatives are comprehended by the invention. For example, data storage elements such as registers may be implemented using any suitable storage device, such as a latches, flip-flops, FIFOs, memory addresses, or RAM cells. Depending on the particular configuration of a design, a bus may consist of one or more individual lines or buses. Muxes may be implemented using any suitable circuit element, such as logic circuits, tri-state circuits, or transmission gate circuits. Some circuits may be implemented as structurally separate from other circuits, or may be implemented in combination with other circuits.

An alternative embodiment of the novel aspects of the present invention may include other circuitries which are combined with the circuitries disclosed herein in order to reduce the total gate count of the combined functions. Because those skilled in the art are aware of techniques for gate minimization, the details of such an embodiment are not described herein.

Although the invention has been described with reference to a specific processor architecture, it is recognized that one of ordinary skill in the art can readily adapt the described embodiments to operate on other processors. Depending on the specific implementation, positive logic, negative logic, or a combination of both may be used. Also, it should be understood that various embodiments of the invention can alternatively employ hardware, software, microcoded firmware, or combinations of each, yet still fall within the scope of the claims. Process diagrams for hardware are also representative of flow diagrams for microcoded and software-based embodiments. Thus the invention is practical across a spectrum of software, firmware and hardware.

Finally, while this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A data processing apparatus comprising:

a register file comprising a plurality of registers, each of said plurality of registers having a corresponding register number;

a first functional unit group connected to said register file and including a plurality of first functional units each having an output and further including an output multiplexer having a plurality of inputs receiving respective outputs of said first functional units and an output, said first functional unit group responsive to an instruction to
  receive data from one of said plurality of registers corresponding to an instruction-specified first operand register number at an operand input,
  operate on said received data employing an instruction-specified one of said first functional units,
  select said output of said instruction-specified one of said first functional units via said output multiplexer, and
  output data from said output of said output multiplexer to one of said plurality of registers corresponding to an instruction-specified first destination register number from an output;

a second functional unit group connected to said register file and including a plurality of second functional units each having an output and further including an output multiplexer having a plurality of inputs receiving respective outputs of said second functional units and an output, said second functional unit group responsive to an instruction to
  receive data from one of said plurality of registers corresponding to an instruction-specified second operand register number at an operand input,
  operate on said received data employing an instruction-specified one of said second functional units,
  select said output of said instruction-specified one of said second functional units via said output multiplexer, and
  output data from said output of said output multiplexer to one of said plurality of registers corresponding to an instruction-specified second destination register number from an output;

a first comparator receiving an indication of said first operand register number of a current instruction and an indication of said second destination register number of an immediately preceding instruction, said first comparator indicating whether said first operand register number of said current instruction matches said second destination register number of said immediately preceding instruction; and a first register file bypass multiplexer connected to said register file, said first functional unit group, said second functional unit group and said first comparator, said first register file bypass multiplexer having a first input receiving data from said register corresponding to said first operand register number of said current instruction, a second input connected to said output of said second functional unit group and an output supplying an operand to said operand input of said first functional unit group, said first multiplexer selecting said data from said register corresponding to said first operand number of said current instruction if said first comparator fails to indicate a match and selecting said output of said second functional unit group if said first comparator indicates a match;

said first functional units of said first functional unit group and said second functional units of said second functional unit group selected whereby functions often executed simultaneously within the same instruction cycle have corresponding functional units placed in different functional unit groups and functions which are not often executed together within the same instruction cycle have corresponding functional units placed in the same functional unit group.

2. The data processing apparatus of claim 1, wherein said register file, said first functional unit group, said second functional unit group, said first comparator and said first register file bypass multiplexer operate according to an instruction pipeline comprising:

a first pipeline stage consisting of a register read operation from said register file to provide operands for a selected functional unit of said first and second functional unit groups and a first half of operation of said selected functional unit of said first and said second functional unit groups, and a second pipeline stage consisting of a second half of operation of said selected functional unit of said first and said second functional unit groups and a register write operation to said register file of results of operation of said selected functional unit of said first and second functional unit groups, wherein the sum of the time of said register read operation and said register write operation equals approximately the sum of the time of said first and second halves of operation of a slowest of said functional units of said first and second functional unit groups.

3. The data processing apparatus of claim 2, wherein:

each first functional unit of said first functional unit group and each second functional unit of said second functional unit group includes a pipeline latch in the middle for latching a logical state of said functional unit between said first pipeline stage and said second pipeline stage.

4. The data processing apparatus of claim 1, further comprising an output register having an input connected to said output of said second functional unit group and an output connected to said register file for temporarily storing said output of said second functional unit group prior to storing in said register corresponding to said second destination register number, wherein said first comparator further receives an indication of said second destination register number of a second preceding instruction, said first comparator further indicating whether said first operand register number of said current instruction matches said second destination register number of said second preceding instruction, and wherein said multiplexer further has a third input connected to said output register output, said multiplexer selecting said output register output if said first comparator indicates a match.

5. The data processing apparatus of claim 1, said first comparator further receiving an indication of said first destination register of said immediately preceding instruction, said first comparator further indicating whether said first operand register number of said current instruction matches said first destination register number of said immediately preceding instruction, said first multiplexer further having a third input connected to said output of said first functional unit group, and said first multiplexer selecting said output of said first functional unit group if said first comparator indicates a match.

6. The data processing apparatus of claim 1, said first functional unit group further responsive to an instruction to receive data from one of said plurality of registers corresponding to an instruction-specified third operand register number at an operand input, said apparatus further comprising:

a second comparator receiving an indication of said third operand register number of a current instruction and an indication of said second destination register number of said immediately preceding instruction, said second comparator indicating whether said third operand register number of said current instruction matches said second destination register number of said immediately preceding instruction; and a second register file bypass multiplexer connected to said register file, said first functional unit group, said second functional unit group and said second comparator, said second register file bypass multiplexer having a first input receiving data from said register corresponding to said third operand register number of said current instruction, a second input connected to said output of said second functional unit group and an output supplying an operand to said operand input of said first functional unit group, said second multiplexer selecting said data from said register corresponding to said third operand number of said current instruction if said second comparator fails to indicate a match and selecting said output of said second functional unit group if said second comparator indicates a match.

7. The data processing apparatus of claim 6, said first comparator further receiving an indication of said first destination register of said immediately preceding instruction, said first comparator further indicating whether said first operand register number of said current instruction matches said first destination register number of said immediately preceding instruction, said first multiplexer further having a third input connected to said output of said first functional unit group, said first multiplexer selecting said output of said first functional unit group if said first comparator indicates a match, said second comparator further receiving an indication of said first destination register of said immediately preceding instruction, said second comparator further indicating whether said third operand register number of said current instruction matches said first destination register number of said immediately preceding instruction, said second multiplexer further having a third input connected to said output of said first functional unit group, and said second multiplexer selecting said output of said first functional unit group if said second comparator indicates a match.

8. The data processing apparatus of claim 1, further comprising:

a second comparator receiving an indication of said second operand register number of a current instruction and an indication of said second destination register number of an immediately preceding instruction, said second comparator indicating whether said second operand register number of said current instruction matches said second destination register number of said immediately preceding instruction; and a second register file bypass multiplexer connected to said register file, said first functional unit group, said second functional unit group and said second comparator, said second register file bypass multiplexer having a first input receiving data from said register corresponding to said second operand register number of said current instruction, a second input connected to said output of said second functional unit group and an output supplying an operand to said operand input of said second functional unit group, said second multiplexer selecting said data from said register corresponding to said second operand number of said current instruction if said second comparator fails to indicate a match and selecting said output of said second functional unit group if said second comparator indicates a match.

9. The data processing apparatus of claim 8, said second comparator further receiving an indication of said first destination register number of an immediately preceding instruction, said second comparator indicating whether said second operand register number of said current instruction matches said first destination register number of said immediately preceding instruction, said second multiplexer further having a third input connected to said output of said first functional unit group, and said second multiplexer further selecting said output of said first functional unit group if said second comparator indicates a match.

10. A data processing apparatus comprising:

a first register file comprising a plurality of registers, each of said plurality of registers having a corresponding register number;

a second register file comprising a plurality of registers, each of said plurality of registers having a corresponding register number;

a first functional unit group including an input connected to said first and second register files, an output connected to said first register file, a plurality of first functional units each having an output, and an output multiplexer having a plurality of inputs receiving respective outputs of said first functional units and an output, said first functional unit group responsive to an instruction to receive data from one of said plurality of registers in said first and second register files corresponding to an instruction-specified first operand register number at an operand input, operate on said received data employing an instruction-specified one of said first functional units, select said output of said instruction-specified one of said first functional units via said output multiplexer, and output data from said output of said output multiplexer to one of said plurality of registers in said first register file corresponding to an instruction-specified first destination register number from an output;

a second functional unit group including an input connected to said first and second register files, an output connected to said second register file, a plurality of second functional units each having an output, and an output multiplexer having a plurality of inputs receiving respective outputs of said second functional units and an output, said second functional unit group responsive to an instruction to receive data from one of said plurality of registers in said first and second register files corresponding to an instruction-specified second operand register number at an operand input, operate on said received data employing an instruction-specified one of said second functional units, select said output of said instruction-specified one of said second functional units via said output multiplexer, and output data from said output of said output multiplexer to one of said plurality of registers in said second register file corresponding to an instruction-specified second destination register number from an output; and a first crosspath connecting said second register file to said first functional unit group comprising a first crosspath comparator, wherein, if said first operand register is in said second register file, said comparator receives an indication of said first operand register number of a current instruction and an indication of said second destination register number of a preceding instruction, and said first crosspath comparator indicates whether said first operand register number of said current instruction matches said second destination register number of said preceding instruction, and a first crosspath multiplexer connected to said second register file, said first functional unit group, said second functional unit group and said first crosspath comparator, said first crosspath multiplexer having a first input receiving data from said register corresponding to said first operand register number of said current instruction, a second input connected to said output of said second functional unit group and an output supplying an operand to said operand input of said first functional unit group, wherein, if said first operand register is in said second register file, said first crosspath multiplexer selects said data from said register corresponding to said first operand number of said current instruction if said first crosspath comparator fails to indicate a match and selects said output of said second functional unit group if said first crosspath comparator indicates a match;

said first functional units of said first functional unit group and said second functional units of said second functional unit group selected whereby functions often executed simultaneously within the same instruction cycle have corresponding functional units placed in different functional unit groups and functions which are not often executed together within the same instruction cycle have corresponding functional units placed in the same functional unit group.

11. The data processing apparatus of claim 10, wherein said first register file, said second register file, said first functional unit group, said second functional unit group, said first crosspath comparator and said first crosspath multiplexer operate according to an instruction pipeline comprising:

a first pipeline stage consisting of a register read operation from said first register file to provide operands for a selected functional unit of said first functional unit group and from said second register file to provide operands for a selected functional unit of said second functional unit group, and a first half of operation of said selected functional unit of said first and said second functional unit groups, and a second pipeline stage consisting of a second half of operation of said selected functional unit of said first and said second functional unit groups and a register write operation to said first register file of results of operation of said selected functional unit of said first functional unit group and to said second register file of results of operation of said selected functional unit of said second functional unit group, wherein the sum of the time of said register read operation and said register write operation equals approximately the sum of the time of said first and second halves of operation of a slowest of said functional units of said first and second functional unit groups.

12. The data processing apparatus of claim 11, wherein:

each first functional unit of said first functional unit group and each second functional unit of said second functional unit group includes a pipeline latch in the middle for latching a logical state of said functional unit between said first pipeline stage and said second pipeline stage.

13. The data processing apparatus of claim 10, further comprising:

an output register having an input connected to said output of said second functional unit group and an output connected to said second register file for temporarily storing said output of said second functional unit group prior to storing in said register of said second register file corresponding to said second destination register number;

wherein said first crosspath comparator further receives an indication of said second destination register number of a second preceding instruction, said first cross path comparator further indicating whether said first operand register number of said current instruction matches said second destination register number of said second preceding instruction; and wherein said first crosspath multiplexer further has a third input connected to said output register output, said first crosspath multiplexer selecting said output register output if said first crosspath comparator indicates a match.

14. The data processing apparatus of claim 10, wherein:
said first functional unit group further responsive to an instruction to receive data from one of said plurality of registers corresponding to an instruction-specified third operand register number at an operand input;
said apparatus further comprising:
a second crosspath comparator receiving an indication of said third operand register number of a current instruction and an indication of said second destination register number of said immediately preceding instruction, said second crosspath comparator indicating whether said third operand register number of said current instruction matches said second destination register number of said immediately preceding instruction; and
a second crosspath multiplexer connected to said first register file, said second register file, said first functional unit group, said second functional unit group and said second crosspath comparator, said second crosspath multiplexer having a first input receiving data from said register corresponding to said third operand register number of said current instruction, a second input connected to said output of said second functional unit group and an output supplying an operand to said operand input of said first functional unit group, said second crosspath multiplexer selecting said data from said register corresponding to said third operand number of said current instruction if said second crosspath comparator fails to indicate a match and selecting said output of said second functional unit group if said second crosspath comparator indicates a match.

15. The data processing apparatus of claim 14, wherein:
said first crosspath comparator further receiving an indication of said first destination register of said immediately preceding instruction, said first crosspath comparator further indicating whether said first operand register number of said current instruction matches said first destination register number of said immediately preceding instruction, said first crosspath multiplexer further having a third input connected to said output of said first functional unit group, said first crosspath multiplexer selecting said output of said first functional unit group if said first crosspath comparator indicates a match;
said second crosspath comparator further receiving an indication of said first destination register of said immediately preceding instruction, said second crosspath comparator further indicating whether said third operand register number of said current instruction matches said first destination register number of said immediately preceding instruction, said second crosspath multiplexer further having a third input connected to said output of said first functional unit group, and said second crosspath multiplexer selecting said output of said first functional unit group if said second crosspath comparator indicates a match.

16. The data processing apparatus of claim 10, further comprising:
a second crosspath comparator receiving an indication of said second operand register number of a current instruction and an indication of said second destination register number of an immediately preceding instruction, said second crosspath comparator indicating whether said second operand register number of said current instruction matches said second destination register number of said immediately preceding instruction; and
a second crosspath multiplexer connected to said first register file, said second register file, said first functional unit group, said second functional unit group and said second crosspath comparator, said second crosspath multiplexer having a first input receiving data from said register corresponding to said second operand register number of said current instruction, a second input connected to said output of said second functional unit group and an output supplying an operand to said operand input of said second functional unit group, said second crosspath multiplexer selecting said data from said register corresponding to said second operand number of said current instruction if said second crosspath comparator fails to indicate a match and selecting said output of said second functional unit group if said second crosspath comparator indicates a match.

17. The data processing apparatus of claim 16, wherein:
said second crosspath comparator further receiving an indication of said first destination register number of an immediately preceding instruction, said second crosspath comparator indicating whether said second operand register number of said current instruction matches said first destination register number of said immediately Preceding instruction, said second crosspath multiplexer further having a third input connected to said output of said first functional unit group, and said second crosspath multiplexer further selecting said output of said first functional unit group if said second crosspath comparator indicates a match.

18. A data processing apparatus comprising:
a register file comprising a plurality of registers, each of said plurality of registers having a corresponding register number;
a first functional unit group connected to said register file and including a plurality of first functional units, said first functional unit group responsive to an instruction to
receive data from one of said plurality of registers corresponding to an instruction-specified first operand register number at an operand input,
operate on said received data employing an instruction-specified one of said first functional units, and
output data to one of said plurality of registers corresponding to an instruction-specified first destination register number from an output;
a second functional unit group connected to said register file and including a plurality of second functional units, said second functional unit group responsive to an instruction to
receive data from one of said plurality of registers corresponding to an instruction-specified second operand register number at an operand input,
operate on said received data employing an instruction-specified one of said second functional units, and
output data to one of said plurality of registers corresponding to an instruction-specified second destination register number from an output;
a first comparator receiving an indication of said first operand register number of a current instruction and an indication of said second destination register number of an immediately preceding instruction, said first comparator indicating whether said first operand register number of said current instruction matches said second destination register number of said immediately preceding instruction; and a first register file bypass multiplexer connected to said register file, said first functional unit group, said second functional unit group and said first comparator, said first register file bypass multiplexer having a first input receiving data from said register corresponding to said first operand register number of said current instruction, a second input connected to said output of said second functional unit group and an output supplying an operand to said operand input of said first functional unit group, said first multiplexer selecting said data from said register corresponding to said first operand number of said current instruction if said first comparator fails to indicate a match and selecting said output of said second functional unit group if said first comparator indicates a match;

said first functional units of said first functional unit group and said second functional units of said second functional unit group selected whereby functions often executed simultaneously within the same instruction cycle have corresponding functional units placed in different functional unit groups and functions which are not often executed together within the same instruction cycle have corresponding functional units placed in the same functional unit group; and wherein said register file, said first functional unit group, said second functional unit group, said first comparator and said first register file bypass multiplexer operate according to an instruction pipeline comprising:

a first pipeline stage consisting of a register read operation from said register file to provide operands for a selected functional unit of said first and second functional unit groups and a first half of operation of said selected functional unit of said first and said second functional unit groups, and a second pipeline stage consisting of a second half of operation of said selected functional unit of said first and said second functional unit groups and a register write operation to said register file of results of operation of said selected functional unit of said first and second functional unit groups, wherein the sum of the time of said register read operation and said register write operation equals approximately the sum of the time of said first and second halves of operation of a slowest of said functional units of said first and second functional unit groups.

19. The data processing apparatus of claim 18, further comprising:

an output register having an input connected to said output of said second functional unit group and an output connected to said register file for temporarily storing said output of said second functional unit group prior to storing in said register corresponding to said second destination register number;

wherein said first comparator further receives an indication of said second destination register number of a second preceding instruction, said first comparator further indicating whether said first operand register number of said current instruction matches said second destination register number of said second preceding instruction; and wherein said multiplexer further has a third input connected to said output register output, said multiplexer selecting said output register output if said first comparator indicates a match.

20. The data processing apparatus of claim 18, wherein:

said first comparator further receiving an indication of said first destination register of said immediately preceding instruction, said first comparator further indicating whether said first operand register number of said current instruction matches said first destination register number of said immediately preceding instruction, said first multiplexer further having a third input connected to said output of said first functional unit group; and said first multiplexer selecting said output of said first functional unit group if said first comparator indicates a match.

21. The data processing apparatus of claim 18, said first functional unit group further responsive to an instruction to receive data from one of said plurality of registers corresponding to an instruction-specified third operand register number at an operand input, said apparatus further comprising:

a second comparator receiving an indication of said third operand register number of a current instruction and an indication of said second destination register number of said immediately preceding instruction, said second comparator indicating whether said third operand register number of said current instruction matches said second destination register number of said immediately preceding instruction; and a second register file bypass multiplexer connected to said register file, said first functional unit group, said second functional unit group and said second comparator, said second register file bypass multiplexer having a first input receiving data from said register corresponding to said third operand register number of said current instruction, a second input connected to said output of said second functional unit group and an output supplying an operand to said operand input of said first functional unit group, said second multiplexer selecting said data from said register corresponding to said third operand number of said current instruction if said second comparator fails to indicate a match and selecting said output of said second functional unit group if said second comparator indicates a match.

22. The data processing apparatus of claim 21, wherein:

said first comparator further receiving an indication of said first destination register of said immediately preceding instruction, said first comparator further indicating whether said first operand register number of said current instruction matches said first destination register number of said immediately preceding instruction;

said first multiplexer further having a third input connected to said output of said first functional unit group, said first multiplexer selecting said output of said first functional unit group if said first comparator indicates a match; and said second comparator further receiving an indication of said first destination register of said immediately preceding instruction, said second comparator further indicating whether said third operand register number of said current instruction matches said first destination register number of said immediately preceding instruction, said second multiplexer further having a third input connected to said output of said first functional unit group, and said second multiplexer selecting said output of said first functional unit group if said second comparator indicates a match.

23. The data processing apparatus of claim 18, further comprising:

a second comparator receiving an indication of said second operand register number of a current instruction and an indication of said second destination register number of an immediately preceding instruction, said second comparator indicating whether said second operand register number of said current instruction matches said second destination register number of said immediately preceding instruction; and a second register file bypass multiplexer connected to said register file, said first functional unit group, said second functional unit group. and said second comparator, said second register file bypass multiplexer having a first input receiving data from said register corresponding to said second operand register number of said current instruction, a second input connected to said output of said second functional unit group and an output supplying an operand to said operand input of said second functional unit group, said second multiplexer selecting said data from said register corresponding to said second operand number of said current instruction if said second comparator fails to indicate a match and selecting said output of said second functional unit group if said second comparator indicates a match.

24. The data processing apparatus of claim 23, wherein:

said second comparator further receiving an indication of said first destination register number of an immediately preceding instruction, said second comparator indicating whether said second operand register number of said current instruction matches said first destination register number of said immediately preceding instruction; and said second multiplexer further having a third input connected to said output of said first functional unit group, and said second multiplexer further selecting said output of said first functional unit group if said second comparator indicates a match.

25. The data processing apparatus of claim 18, wherein:

each first functional unit of said first functional unit group and each second functional unit of said second functional unit group includes a pipeline latch in the middle for latching a logical state of said functional unit between said first pipeline stage and said second pipeline stage.

* * * * *